United States Patent [19]

Quade et al.

[11] Patent Number: 4,914,689
[45] Date of Patent: Apr. 3, 1990

[54] REVERSE AUTOMATIC NUMBER IDENTIFICATION SYSTEM

[75] Inventors: Robert C. Quade, Lakewood, Colo.; Mark S. Bredesen, Incline Village, Nev.; Raymond L. Hauck, Randolph, Minn.; Scott R. Grabinger, Maple Grove, Minn.; John T. Pugaczewski, St. Paul, Minn.

[73] Assignee: Bell Mountain States Telephone & Telegraph Co., Denver, Colo.

[21] Appl. No.: 136,742

[22] Filed: Dec. 22, 1987

[51] Int. Cl.⁴ .................. H04M 1/57; H04Q 3/72
[52] U.S. Cl. ........................ 379/142; 379/245; 379/247
[58] Field of Search ............ 379/142, 245, 246, 247, 379/249, 127, 201

[56] References Cited

U.S. PATENT DOCUMENTS

| | | | |
|---|---|---|---|
| 3,864,522 | 2/1975 | DeKozan et al. | 379/142 |
| 3,904,830 | 9/1975 | Every, Sr. et al. | 379/142 |
| 3,943,298 | 3/1976 | Clark et al. | 379/197 |
| 3,997,732 | 12/1976 | Every, Sr. et al. | 379/142 |
| 4,241,238 | 12/1980 | Strand | 379/142 |
| 4,242,539 | 12/1980 | Hashimoto | 379/142 |
| 4,289,931 | 9/1981 | Baker | 379/249 |
| 4,320,258 | 3/1982 | McDonald | 379/201 |
| 4,754,475 | 6/1988 | Pintos et al. | 379/142 |
| 4,763,191 | 8/1988 | Gordon et al. | 379/246 |

FOREIGN PATENT DOCUMENTS

| | | | |
|---|---|---|---|
| 0076646 | 4/1983 | European Pat. Off. | 379/247 |
| 0106318 | 4/1984 | European Pat. Off. | 379/247 |

Primary Examiner—Jin F. Ng
Assistant Examiner—Wing F. Chan
Attorney, Agent, or Firm—Timothy R. Schulte

[57] ABSTRACT

A reverse number identification system is described which allows the called party in a telephone link to identify the telephone directory number of the calling party. This system includes a first system component located at the customer's premises which includes a display for the calling party's directory number. A second system component includes equipment connected to the calling party's telephone line located in the calling party's central office which transmits upon request the directory number of the calling party to the first system component. Each subscriber's telephone line in the central office has a microprocessor controlled transceiver placed between the incoming subscriber's telephone line and the central office switching equipment. Each subscriber's premises includes a first system component designed to receive and display the calling party's telephone number. In operation, the calling party dials the directory number of the called party and the called party responds by answering. The second system component in the called party's central office signals to the second system component in the calling party's central office by means of a request to send the directory number of the calling party. In response to this request, the second system component in the calling party's central office transmits the directory number of the calling party. The first system component located at the called party's premises receives the directory number and displays it for the called party.

9 Claims, 22 Drawing Sheets

REVERSE AUTOMATIC NUMBER IDENTIFICATION SYSTEM

FIELD OF THE INVENTION

The present invention relates to telephone communication equipment, and more particularly to the field of automatic number identification.

BACKGROUND OF THE INVENTION

Automatic number identification (ANI) systems have been used in telephone switching equipment for many years to properly and automatically bill long distance toll charges to the appropriate calling parties. Automatic recording and processing of the directory number of the calling subscriber was developed by the Bell System. This allowed centralized automatic message accounting for long distance calls. The identity of the calling line is determined by ANI circuits installed in a central office equipment, along with automatic message accounting equipment.

Central office ANI equipment is an integral part of the central office equipment and uses identifier circuits to trace the connection from the calling party to the called party using an identification tone applied to the connection and tracing the tone. When the tone is traced to the called subscriber's line, an out-pulser is invoked to transmit using multi-frequency (MF) tones the called subscriber's number to the calling subscriber's central office equipment. When all of the digits have been transmitted, the telephone line is cut through for talking and the centralized automatic message accounting system reports the called party's number in the central office of the calling party for later billing. Thus, the local central office of the calling subscriber records both the telephone number of the called party and the telephone number of the calling party. However, the central office of the called party or the called party himself/herself is unaware of the directory number of the calling party.

A reverse automatic number identification system has been developed for local use between local central offices for the 911 emergency system. The automatic number identification equipment in the local central offices are utilized to locate the telephone directory number of the calling party and transmit it using multi-frequency tones to the 911 operator, where it is displayed on a CRT screen or printer.

The present invention is designed to provide reverse automatic identification of the calling subscriber's telephone number to the called party by means of reverse ANI equipment installed in central offices and installed in customer premises which does not interfere with the normal operations of the central office ANI equipment. This "add-on" equipment operates either locally or over long distances to provide the area code, telephone number and type of calling subscriber (e.g., business, residential, pay phone, etc.) to the called party. Reverse automatic number identification equipment for use by subscribers is unknown in the prior art.

SUMMARY OF THE INVENTION

The present invention allows the called party to identify the calling party in a telephone link. In the preferred embodiment of the present invention, a reverse number identification system is described which includes a first system component connected to the calling party's telephone line at the subscriber's premises, at the subscriber's central office, or somewhere in between. The system also includes a second system component connected to the called party's telephone line and adaptable to receive information from the calling party's telephone equipment to identify the directory number of the calling party. In the preferred embodiment of the present invention, a display mechanism is connected to the called party's telephone equipment which displays the directory number of the calling party, along with other pertinent information. The preferred embodiment of the present invention is designed to be added to the existing telephone equipment of existing central offices without modifying or utilizing currently existing automatic number identification equipment used for billing purposes or 911 emergency identification.

The preferred embodiment of the present invention also includes a method by which a called party may identify a calling party directory number comprising the steps of placing the called party's telephone equipment in the off hook position, transmitting a "request to send" (RTS) signal from the called party's telephone equipment to the calling party's telephone equipment, receiving the RTS signal at the calling party's telephone equipment, transmitting the directory number of the calling party in response to the RTS signal, receiving the directory number of the calling party at the called party's location, and displaying the directory number of the calling party to the called party.

BRIEF DESCRIPTION OF THE DRAWINGS

In the drawings, where like numerals identify like components throughout the several views of the preferred embodiment.

DETAILED DESCRIPTION OF THE PREFERRED EMBODIMENTS

In the following detailed description of the preferred embodiment, reference is made to accompanying drawings which form a part hereof and in which is shown by way of illustration a specific embodiment in which the invention may be practiced. This embodiment is described in sufficient detail to enable those skilled in the art to practice the invention and it is to be understood that other embodiments may be utilized and that structural changes, electrical changes or logical changes may be made without departing from the scope of the present invention. The following detailed description is, therefore, not to be taken in a limiting sense and the scope of the present invention is defined by the appended claims.

The present invention is intended to provide the telephone number of the calling party to the called party in standard telephone systems. At present, the called party is unable to identify the location or identity of the calling party during any standard telephone call. Exceptions to this are known in the prior art, such as the 911 emergency and police telephone system. These systems use the standard automatic number identification (ANI) system of the telephone switching equipment to identify the calling party. In contrast to this, the preferred embodiment of the present invention is a system designed to be added to the presently existing telephone central office switching equipment and to the customer premises so as to not interfere with the operation of that equipment and so as to not require substantial overhauling of the present automatic number identification system to adapt it to a reverse automatic number identification (RANI) system such as the type used in the present invention.

Figure 1:
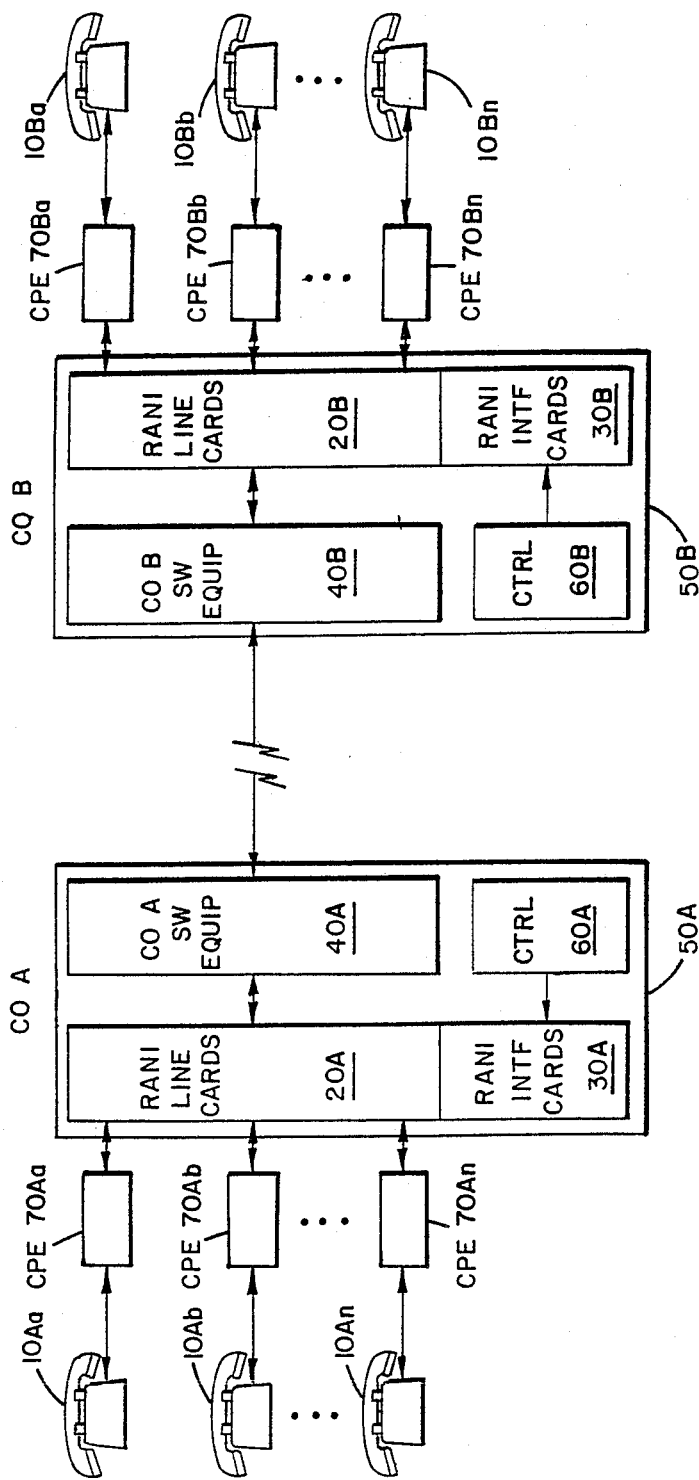
FIG. 1 is a block diagram describing the reverse automatic number identification system organization.

FIG. 1 shows a block diagram of the interconnection of the various components of the present invention. Telephones 10A$a$–10$n$ are shown connected through standard telephone lines to central office A, indicated as 50A in FIG. 1. Telephone switching equipment 40A of central office A operates in a standard fashion to connect the telephones connected to central office A to central office B, which in turn connects to standard telephones 10B$a$–10B$n$. Thus, embodied in the diagram of FIG. 1 is a standard telephone switching network. Central office A and central office B as shown may be local central offices or may be remote from one another requiring communication over trunk telephone lines of a long distance. The operation of the local central office switching equipment, however, is immaterial to the distance between the central offices and does not affect the operation of the present invention.

Shown connected between the telephones and the central office switching equipment are one of the components of the present invention. For example, customer premises equipment (CPE) 70$a$A is shown connected between telephone 10A$a$ and central office 50A. The CPE (generally referenced as 70) may be a stand-alone box into which the telephone line and the telephone are interconnected in a loop-through fashion, or the CPE 70 may be integrally incorporated into the telephone itself. As will be more fully discussed below, the CPE 70 includes an LCD display which, in operation, will display the calling party's telephone number. Each of the telephones 10A of central office A are shown with an associated CPE 70A which is located somewhere near the local telephones owned by the customer so that the customer may see the LCD display and note the number of the calling party. Each telephone 10 and CPE 70 is connected in a standard fashion to the central office switching equipment. Incorporated into the central office switching equipment are the RANI line cards 20A which are inserted between the incoming customer telephone lines and the central office switching equipment as shown for central office A. In a like fashion, the telephones associated with central office 50B each have a CPE 70B associated with each customer telephone. Also inserted between the incoming telephone lines and the central office B switching equipment 40B are the RANI line cards 20B. Attached to the racks of RANI line cards are the RANI interface cards 30A and 30B. These interface cards in turn connect the RANI system to computing and control equipment 60A and 60B which support and control the system.

Figure 2:
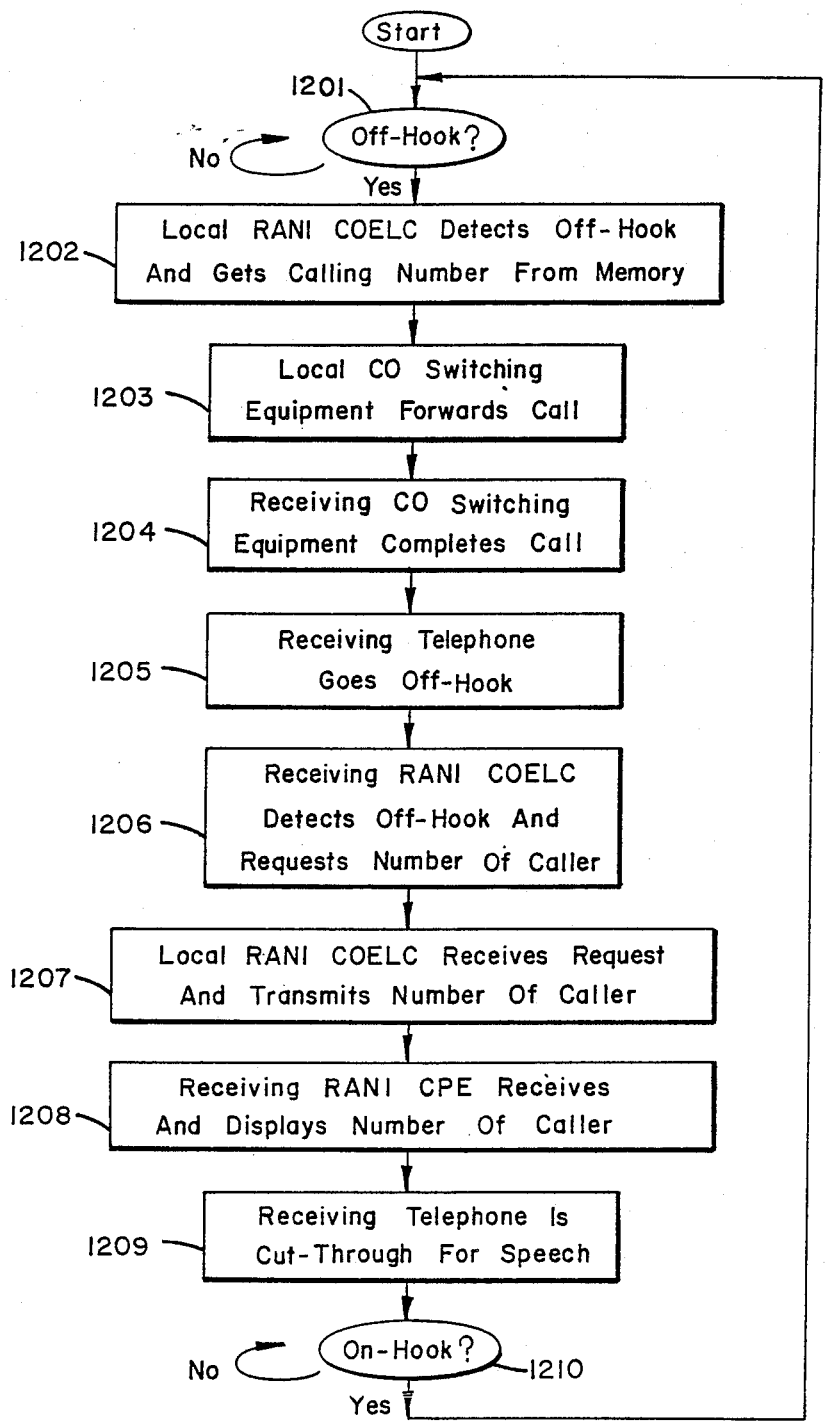
FIG. 2 is a flow chart showing the operation of the system described in FIG. 1.

FIG. 2 is a description of the process by which the CPE unit 70 (shown in FIG. 1) located in line with the existing subscriber telephone equipment operates to provide the subscriber with a visual indication of the origin of a received call. The central office equipment line cards (COELC) 20 operate in conjunction with the CPE units 70 to communicate subscriber telephone numbers between calling and called parties using the existing central office switching equipment and line interconnections to transfer information. The operation of the RANI system has been designed to be nearly transparent to the user and to the telephone switching equipment found in the central offices. In this fashion, the existing telephone networks can be upgraded to allow the use of the present invention without modification and without interruption of telephone service.

Assume, for the following example that telephone 10A$a$ is the calling party and telephone 10B$a$ is the called party. The operation of the RANI system begins with the calling party's telephone 10A$a$ going off-hook, as indicated at location 1201 of FIG. 2. When the calling party's telephone is taken off-hook, the local RANI COELC 20A detects the off-hook condition on the individual subscriber's line and matches that telephone line to the caller's telephone number which is obtained from local memory. This memory can be updated from a computer database, as indicated in box 1202. In the next step of operation, the local central office switching equipment 40A will also detect the off-hook condition and begin forwarding the telephone call according to the number dialed by the caller, as indicated in box 1203. As the telephone call is forwarded from the local central office 50A to the receiving central office 50B, the receiving central office switching equipment 40B will complete the call, as indicated in box 1204. At this point, the called party's telephone 10B$a$ will ring. Of course if, in the simple case, the telephone is never answered, the calling party's telephone will go back on-hook and the process will enter the normal idle state 1201. However, if the called party's telephone goes off-hook to answer the call, as indicated in box 1205, the receiving central office RANI COELC 20B will detect the off-hook condition on the called party's telephone 10B$a$ and send a short burst of encoded information which acts as a request to the calling party's RANI COELC 20A to transmit the number of the caller to the called party's CPE 70B$a$. This request, as indicated in box 1207, will result in the calling party's COELC 20A transmitting the calling party's telephone number over the telephone lines to the receiving party's CPE. The telephone number of the caller is transmitted using a standard encoded digital transmission technique sent at a high speed at a very short time after the request, which has been in turn generated a very short time after the called party's telephone goes off-hook. This rapid request and response of the calling party's telephone number does not interfere with the telephone call, since it operates in less than a half-second after the telephone goes off-hook, which is nearly transparent to the user. Also during this data transmission, the local COELC opens the calling party's line to prevent the calling party from scrambling the information and provides open switch interval protection (OSIP) to the calling party.

As indicated in box 1208 of FIG. 2, the receiving RANI CPE 70Ba receives the encoded telephone number and displays the number of the caller on an LCD display mounted within the CPE. Immediately after receiving the caller's telephone number, the telephone call is cut through for speech, as indicated in box 1209. The entire system once again rests in an idle state, as indicated by box 1210, until the called party's telephone 10Aa is placed on-hook, at which time the flow chart of FIG. 2 indicates that the system is back to the start idle point.

Figure 3:
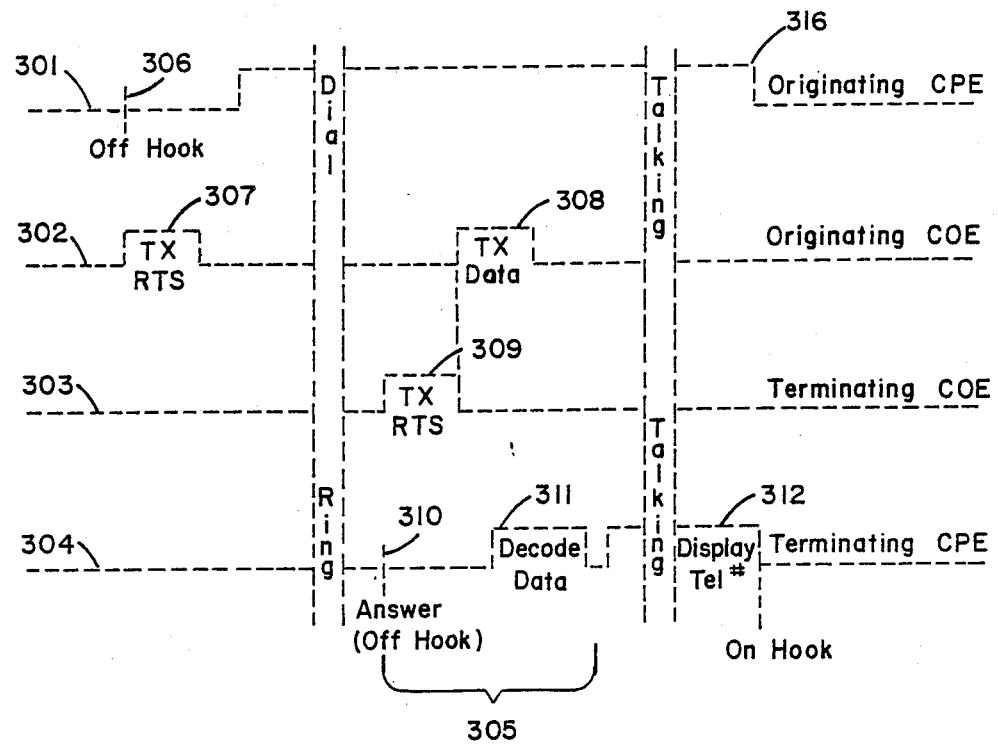
FIGS. 3 and 3a show the timing or sequence of events involved in communicating the telephone number of the calling party to the called party.

The timing diagram of FIG. 3 shows the relative positions of the events during the operation of the RANI system. As indicated on line 301, the calling party's telephone equipment 10Aa goes off-hook, as indicated at 306, which activates the originating CPE 70Aa for the duration of the telephone call. The CPE units 70 are receive-only devices which are always active when the subscriber's telephone equipment goes off-hook. The originating CPE 70Aa. is not deactivated until the calling party's telephone is placed back on-hook at 316. Since this diagram assumes that a CPE exists at both the terminating and originating ends of the telephone line, the originating COELC 20A for the calling party's local central office 50A is unaware as to whether the calling party's telephone went off-hook to transmit a call or to receive a call. Thus, as indicated on line 302 for the originating COELC 20A, the COELC will always transmit a "request to send" (RTS) signal 307 in response to the off-hook condition, and in the assumption that the local calling party's telephone is going off-hook in response to an incoming telephone call. Not receiving the requested data within a preselected time window, the originating COELC 20A will assume that the calling party's telephone was lifted in response to originating a call.

The originating telephone is then dialed by the calling party, as indicated by the dial label of FIG. 3 within the first pair of vertical dashed lines (representing a compressed time frame). During this period of time, the telephone company central office switching equipment operates to forward the call from the calling party to the called telephone. As indicated on line 304 within the first set of vertical dashed lines, the called party's telephone 10Ba will ring in response to the calling party's request and will subsequently go off-hook at event 310. In response to the off-hook signal generated by the terminating telephone equipment 10Ba, the terminating COELC 20B in the central office 50B will transmit a request to send (RTS) signal, as indicated on line 303, event 309. This request to send is received by the originating COELC 20A which, in response thereto, transmits the data as shown on line 302, event 308, which corresponds to the calling party's telephone number.

The terminating CPE 70Ba then decodes the transmitted data at event 311 and displays the telephone number at event 312 until the terminating telephone 10Ba goes on-hook, at which time the display is blanked.

Figure 3A:
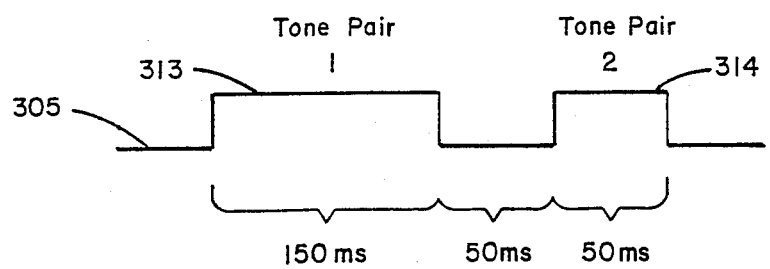

The entire time period as shown by space 305 of FIG. 3 is less than a half-second, which presumably would be transparent to the user of the telephone equipment. FIG. 3A shows the request to send (RTS) signal's detailed timing on line 305 which corresponds to the RTS signals transmitted at events 307 and 309 of FIG. 3. The request to send signal is in the preferred embodiment actually a dual burst, dual tone pair with one tone pair transmitted for 150 ms followed by a 50 ms quiet state, after which a second tone pair is transmitted for 50 ms. As more fully discussed below, the tone pairs used to request the transmission of the calling party's telephone number are DTMF-shifted tone pairs which are shifted in frequency such that they do not interfere with the normal DTMF tone response switching equipment of the telephone company.

In the preferred embodiment, the CPE unit 70 will display the originating subscriber's 10-digit telephone number. In addition, provisions for display of up to three attributes defining originating subscriber service can be included. In the preferred embodiment, the display is a 12-digit LCD display with two digits unused to provide spaces in the displayed phone number for clarity and to correspond to the generally accepted spacing technique for displaying telephone numbers. The display of the telephone numbers is grouped according to, first, a three-digit area code, followed by a space, followed by a three-digit central office location code, followed by a space, followed by a four-digit subscriber code within the central office location. In addition, codes can be included to indicate whether the calling party is a business or residence or public telephone. As was previously stated, the CPE unit can be provided in a stand-alone enclosure with modular connectors and/or pigtail leads to permit in-line installation in several appliances. In an alternate embodiment, the CPE could be installed inside the standard telephone enclosure with an LCD display on the dial face, handset or the like.

Figure 4:
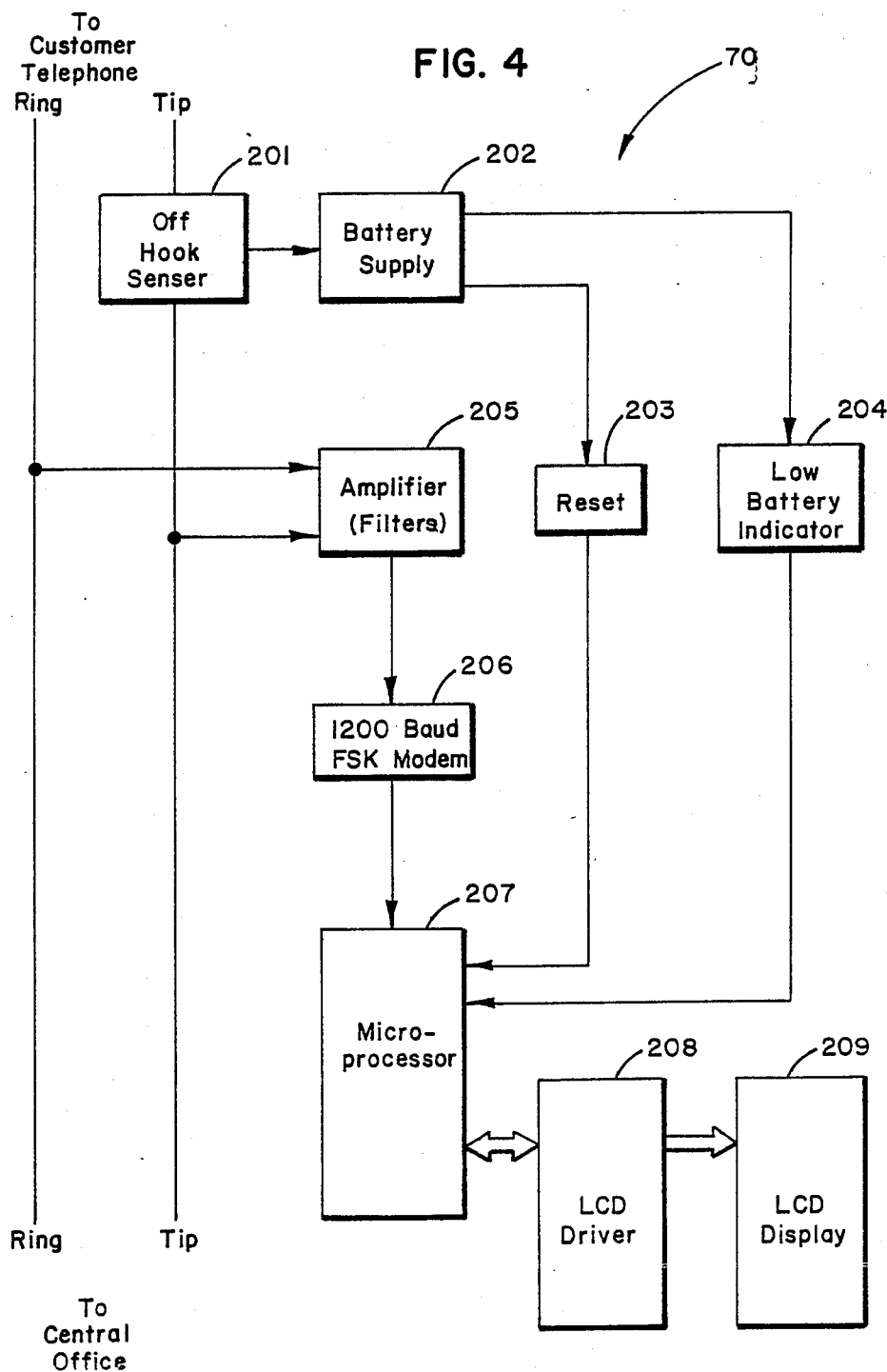
FIG. 4 is a block diagram of the components of the customer premises equipment (CPE) in the reverse automatic number identification system.

A block diagram of the circuitry of the CPE 70 is shown in FIG. 4. The CPE 70 is a receive-only device placed on the tip and ring wires between the central office telephone line and the customer's telephone. Off-hook sensor 201 detects when a customer's telephone goes off-hook by the current loop produced in response thereto. The off-hook sensor 201 invokes the activation of a battery supply 202 which supplies the circuit, generates a reset signal 203, and monitors battery condition at 204. These signals are sent to microprocessor 207 for processing or display. Amplifier 205 includes bandpass filters and is connected between the tip and ring wires. The amplifier conditions the signals received from the tip and ring wires of the telephone connection and sends the conditioned signals to a 1200-baud FSK modem 206 in the preferred embodiment. Those skilled in the art will recognize that other forms of data reception devices can be used in place of the preferred modem. The modem 206 is connected to microprocessor 207 which receives the decoded information in the form of a telephone number. The microprocessor then drives LCD driver 208 which in turn displays the telephone number on LCD display 209.

Figure 5A:
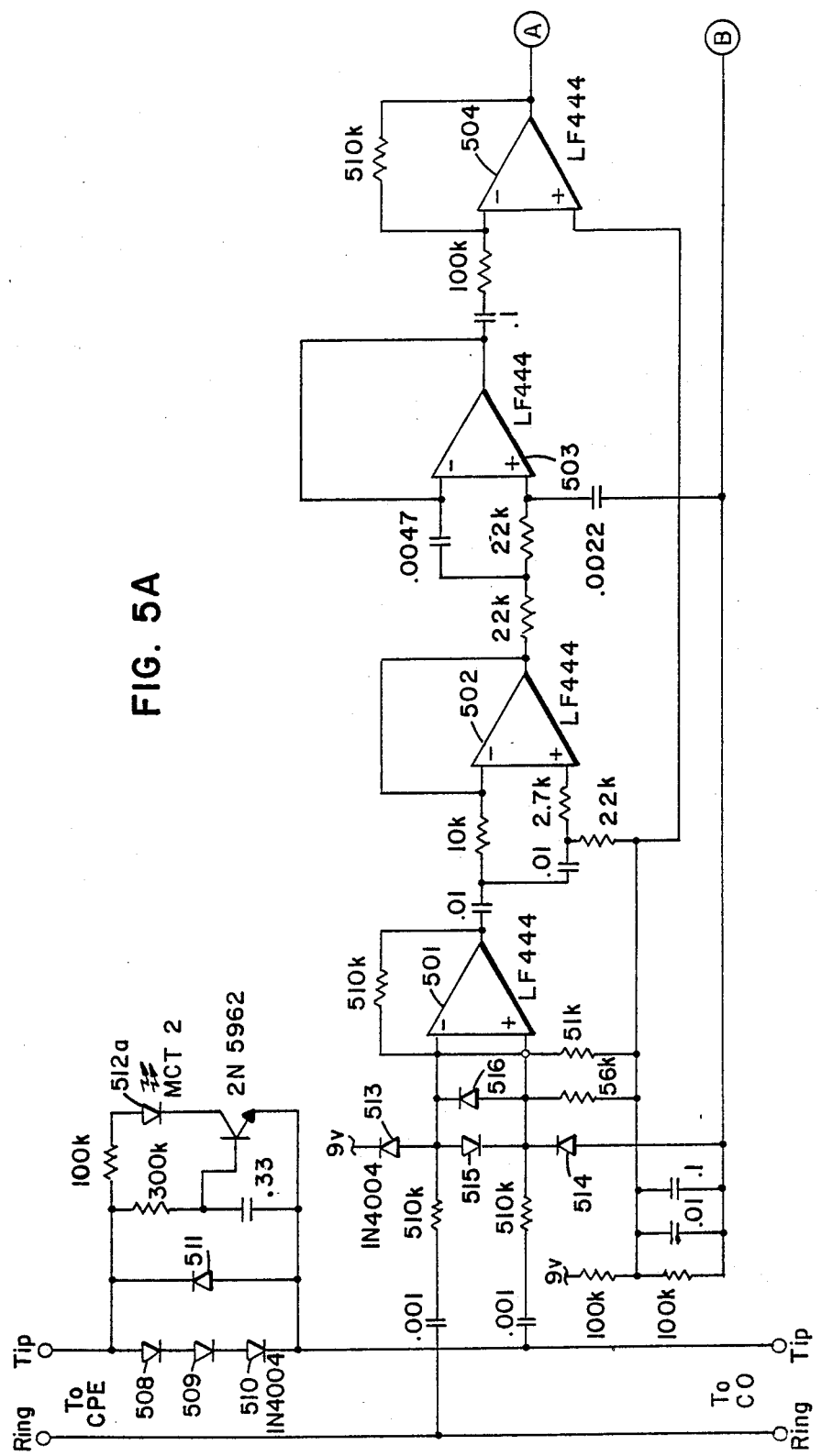
FIGS. 5A, 5B, 5C and 5D comprise the detailed electrical schematic diagrams of the customer premise equipment shown in FIG. 4.

FIGS. 5A, 5B, 5C and 5D comprise the detailed schematic diagrams of the CPE unit 70 shown in the block diagram of FIG. 4. Referring to FIG. 5A, the tip and ring connections to the customer's telephone and the tip and ring connections to the central office are shown on the left-hand side of the drawing. Three diodes of a standard rectifier type (IN4004, available from Motorola and other semiconductor vendors) are placed in the ring line of the telephone line connection. The voltage drop developed across these three diodes when current passes along the tip line in response to an off-hook signal is detected by the small circuit attached thereto. The current flowing through the three diodes in the tip line serves to bias the base of transistor 2N5962 such that it is placed in an ON state, allowing current to pass through the light-emitting diode of optical coupler MCT2. This optical coupler is used to detect an off-hook condition and activate the CPE.

Figure 5B:
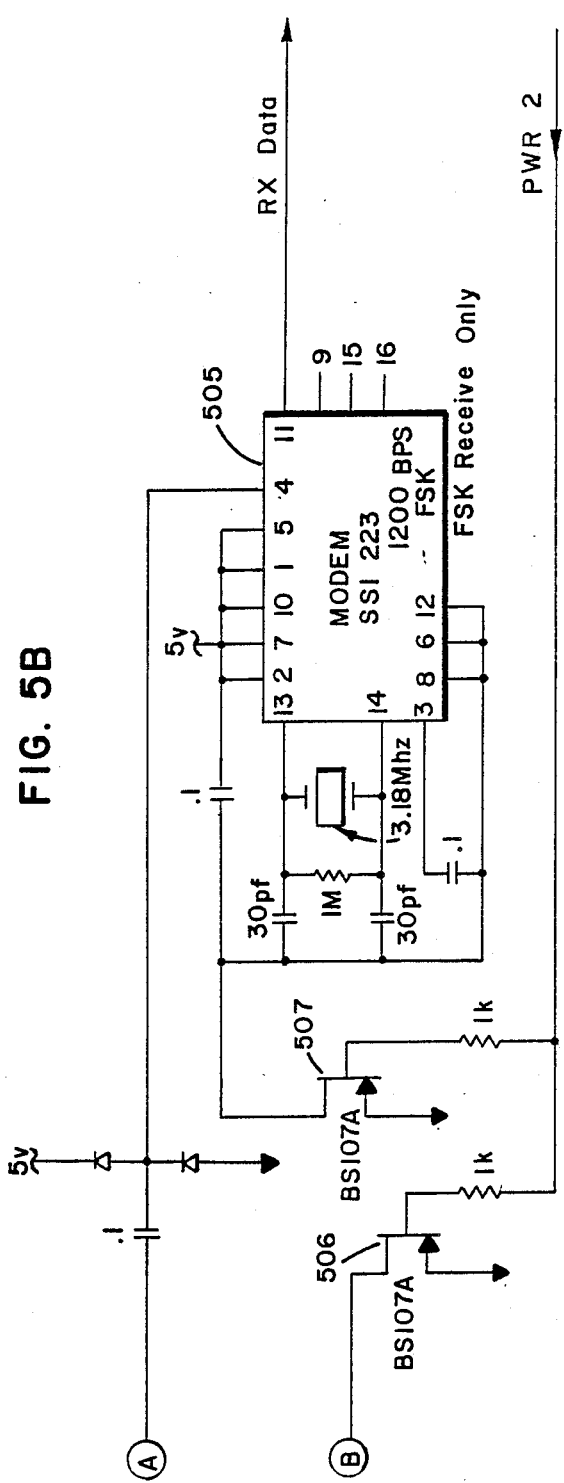
Figure 5B:
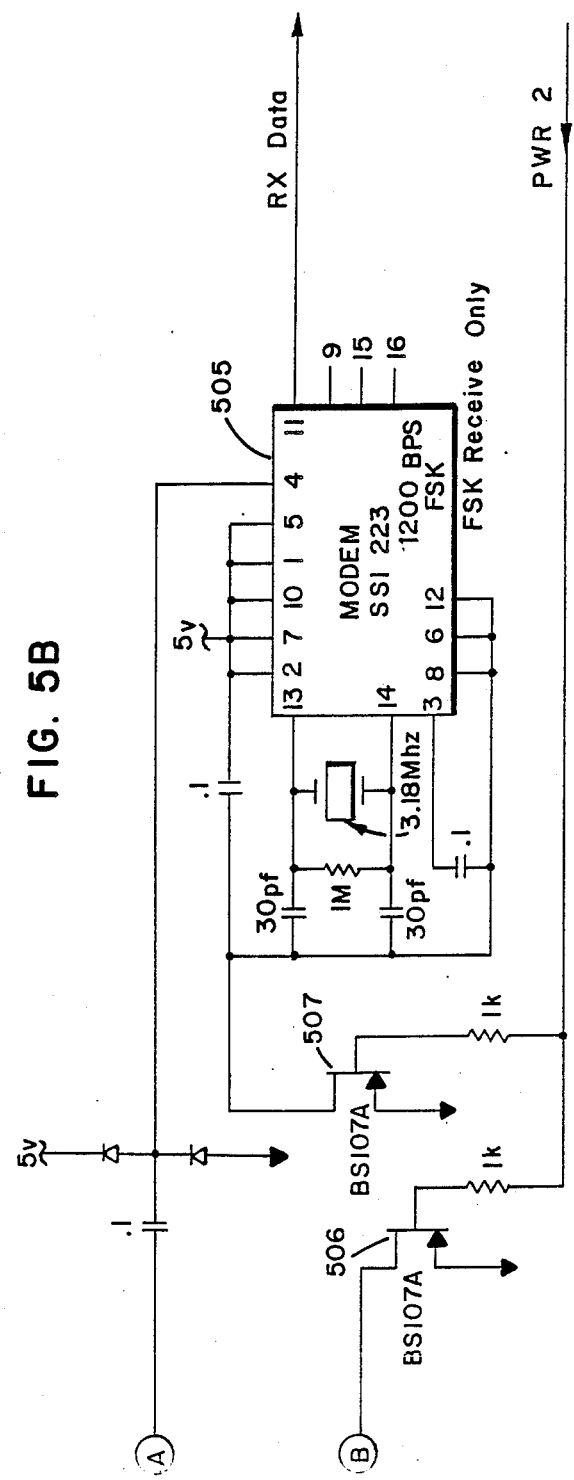
Figure 5C:
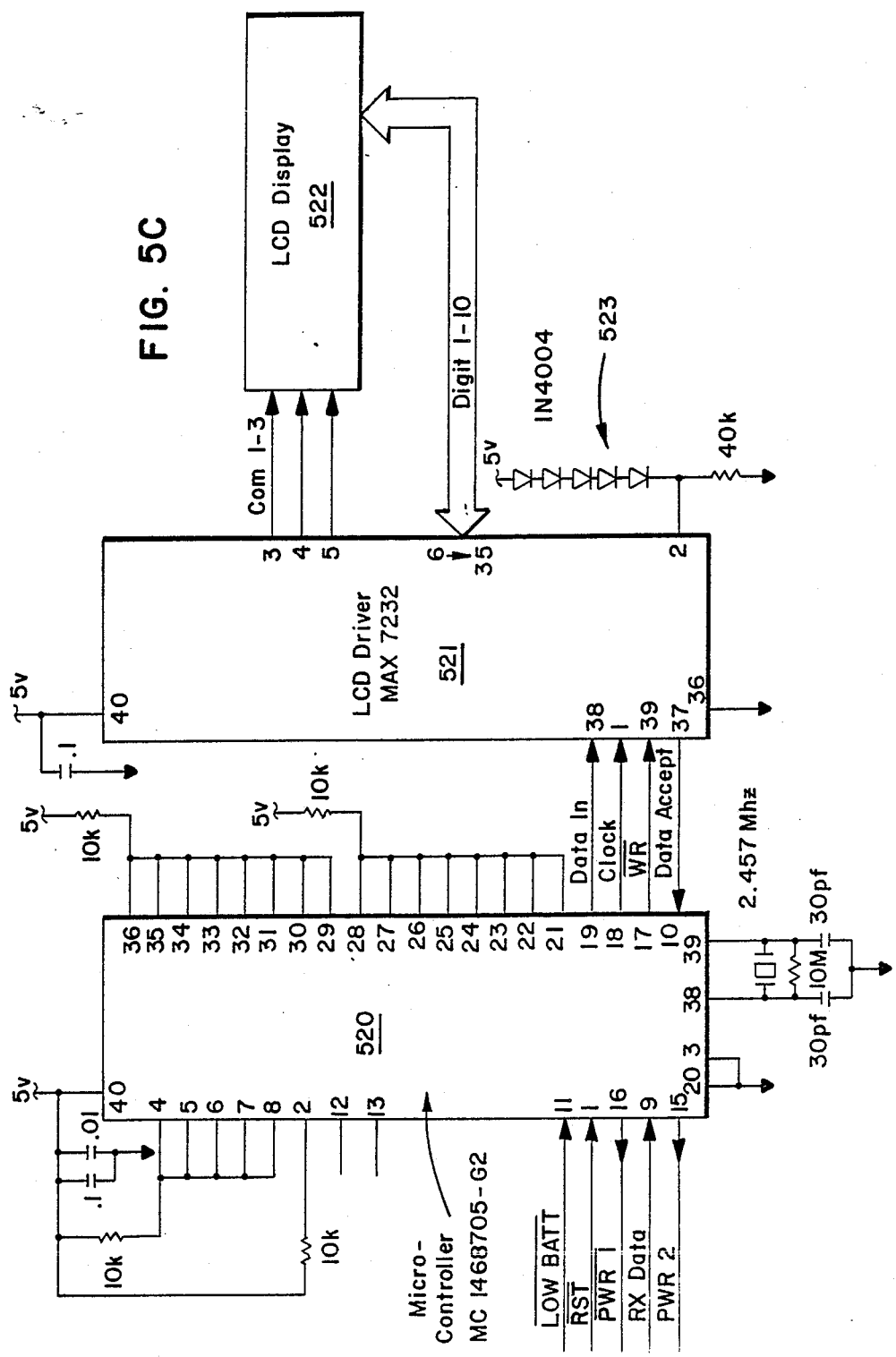
Figure 5D:
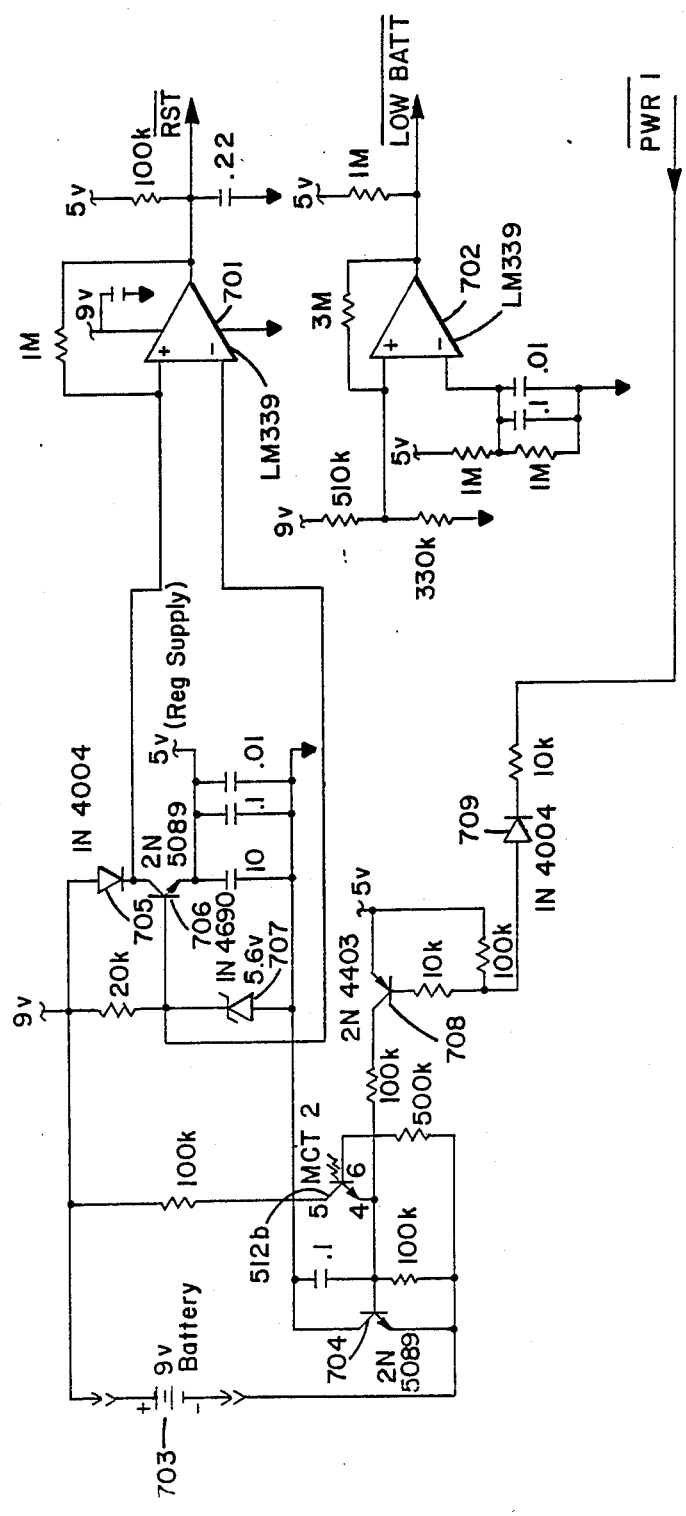

Referring to FIG. 5D, the other half of optical coupler MCT2 is shown as a receiving transistor which is biased ON when the light impinges on the base connection. When the optical coupler MCT2 is activated by the current flowing through the tip wire of the telephone line, the transistor side of the optical coupler allows current to pass from the 9V battery through the 100 kohm resistor attached to the collector of the MCT2 transistor, the emitter of which places a small base current on NPN transistor 704, activating it in turn. Transistor 704 completes a ground circuit between the common or ground connection of the CPE unit and the negative terminal of the 9V battery 703. Thus, upon activation of the optical coupler MCT2, voltage is applied to the operating circuits of the CPE by completion of the ground loop through transistor 704.

Once the ground connection is made between the common terminal of the circuits and the negative terminal of the 9V battery 703, a 5V regulated supply is established for powering the circuitry. A current path from the positive terminal of 9V battery 703 is established through the 20 kohm resistor attached to the cathode of zener diode 707. This zener diode is in the preferred embodiment an IN4690, available from Motorola semiconductor and other vendors, with a reverse breakdown voltage of 5.6VDC. The cathode of zener 707 is also attached to the base of NPN transistor 706, which operates as a simple voltage regulator circuit to maintain the voltage on the emitter of transistor 706 at approximately 5VDC. The emitter of transistor 706 then serves as a source of the 5V regulated supply for the rest of the circuit. Appropriate filter capacitors are also included and attached between the 5V regulated supply and ground to filter any transients which may be generated by the switching transistors of the circuitry.

Several signals are generated by the circuitry in FIG. 5D upon power-up which are used by the microprocessor to properly sequence and control the operation of the CPE. Upon initial power-up a reset signal (RST) is generated which resets the microprocessor to its initial state for processing. This signal is generated from the output of comparator 701 which is in the preferred embodiment an LM339 comparator available from National Semiconductor and other vendors. The inverting input of comparator 701 compares the 5.6VDC on the cathode of zener diode 707 to the approximately 9VDC signal (less the diode drop of diode 705) found at the collector of transistor 706, which is attached to the noninverting input of comparator 701. Upon initial application of power, a short negative going pulse will occur on the output of comparator 701 due to the initial application of current to the 0.22 microfarad capacitor attached between the output of comparator 701 and ground. This capacitor provides a very low impedance to the step function that would occur upon initial power-up out of comparator 701, and hence a short negative going pulse would occur which exponentially would ramp backup to +5VDC as the capacitor charges.

A low battery signal is also generated for the benefit of the CPE unit to indicate to the customer that the batteries of the CPE unit require changing. Comparator 707 compares the 9VDC voltage which is divided by a voltage divider comprised of resistors 510k and 330k attached to the noninverting input of comparator 702. This comparator is in the preferred embodiment an LM339 available from National Semiconductor and other vendors. This resistance divider network divides down the 9VDC battery voltage to approximately just above 3VDC. The 5VDC regulated voltage is divided in half (to approximately 2.5VDC) by another resistor divider network comprised of two 1-megohm resistors. This divided-down 5VDC voltage is applied to the inverting input of comparator 702. Thus, when the 9V battery voltage falls below an acceptable threshold, comparator 702 will create a negative going signal indicated by the LOW BATT [add overbar] on the right of FIG. 5D. This will indicate to microprocessor 520 of the CPE that the user should be alerted to a low battery condition.

Immediately after the Reset is released the microprocessor will activate the PWR1 signal. Activation is a logic "low" signal. This will turn on transistor 708. Approximately 5V will now be at the base of transistor 704. Transistor 704 has already been turned on, however with transistor 708 being microprocessor controlled, transistor 704 will be kept on until after the RANI message or a timeout has occurred on the CPE.

After the RANI message is received or a timeout has occurred, PWR1 is turned off. Therefore, the message will only remain in the CPE display as long as the user is off-hook. As soon as the user goes on-hook, MCT2 will turn off, followed by transistor 704.

Once the off-hook signal is detected by the power supply portion of the CPE, the circuits are activated and the CPE waits in a monitor mode for the information it needs to display the calling party's telephone number. Referring once again to FIG. 5A, the tip and ring wires from the central office are monitored by amplifier 501 through DC blocking capacitors and voltage limiting diodes 513, 514, 515 and 516. The amplified signal is passed to a high-pass filter which is implemented using an LF444 operational amplifier 502 available from National Semiconductor and other vendors. The output of the high-pass filter is driven to a low-pass filter, which is also implemented in the preferred embodiment using an LF444 operational amplifier 503. The combination of the high-pass filter and the low-pass filter is arranged and tuned to create a band-pass filter in combination.

The output of the band-pass filter network is buffered by operational amplifier 504, which in turn feeds the limited and buffered signal to the signal input of modem 505 in FIG. 5B. This modem is in the preferred embodiment an SSI223 1200BPS FSK modem operating in receive-only mode. This modem is a commonly available monolithic integrated circuit available from Silicon Systems Incorporated. Modem 505 is implemented using a minimum number of discrete support components in a conventional fashion, as recommended by the manufacturer.

The four operational amplifiers 501, 502, 503 and 504 are isolated from ground or system common by MOSFET 506. In a like fashion, modem 505 is isolated from ground through MOSFET 507. The gates of the aforementioned MOSFETs are controlled by the PWR2 signal from microprocessor 520. In this fashion, the microprocessor can control the activation of the signal sensing circuits and can power-down the circuits after the telephone number has been received, to conserve battery power.

The output of modem 505 is on line RX DATA which directly drives microprocessor or microcontroller 520 shown in FIG. 5C. This microprocessor in a preferred embodiment of the present invention is implemented with a Motorola microcontroller pa No. MC1468705-G2, which is part of the 6800 family of microprocessor products available from Motorola Semiconductor and other vendors. This microcontroller contains on-board RAM and ROM memories and operates as a self-contained unit for executing a small control program necessary for the operation of the CPE unit. The function of microcontroller 520 is to receive the telephone number of the calling party from modem 505 and drive LCD driver 521 with the information in a serial fashion for display on LCD display 522. In the preferred embodiment of the present invention, an MAX 7232 LCD driver component available from Maxim Semiconductor is used in combination with an LCD display. The details of the interconnection of the components of the CPE are shown in FIGS. 5A, 5B, 5C and 5D, which will be understood by those skilled in the art upon reading and understanding the foregoing description in view of the schematic diagrams.

Figure 6:
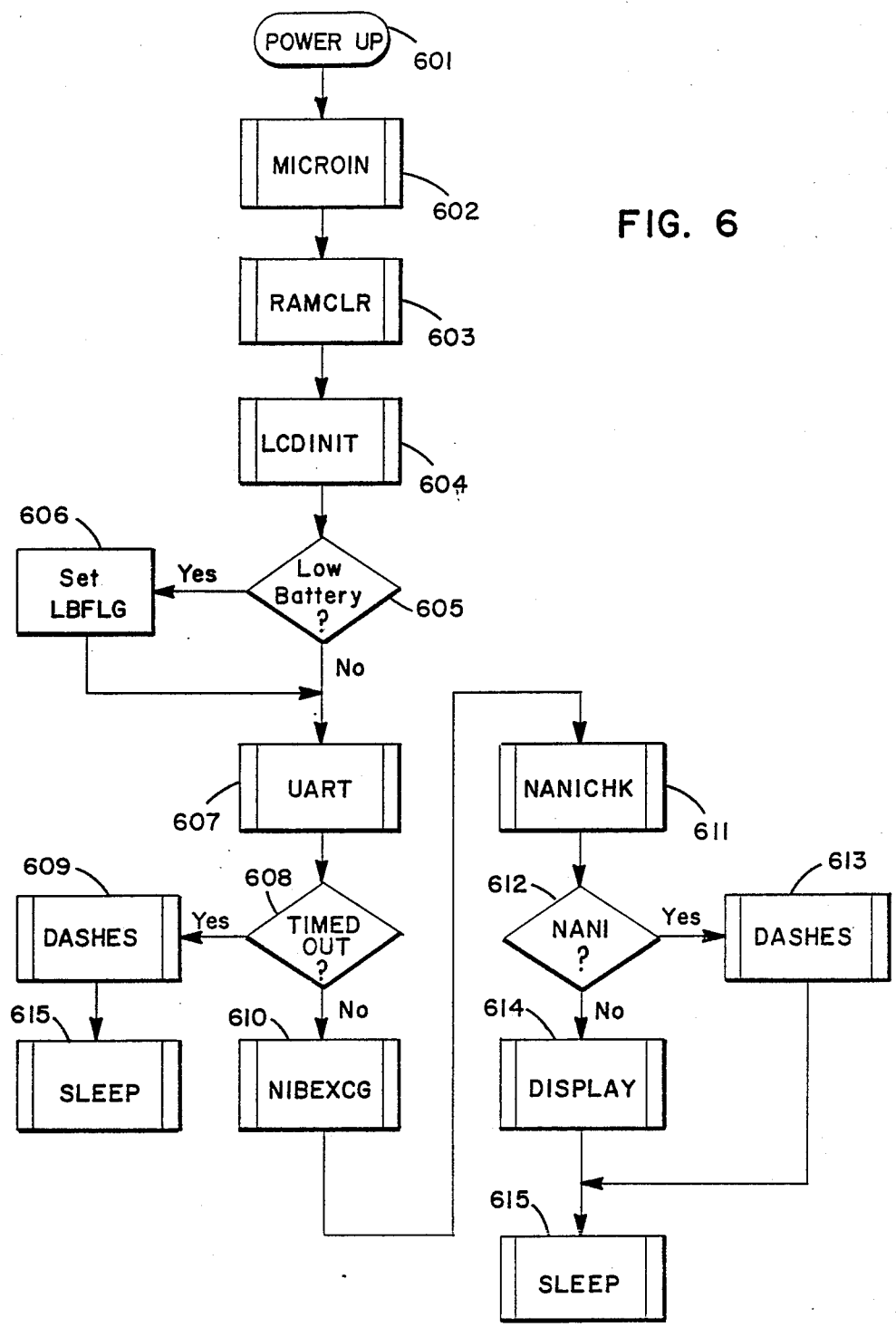
FIG. 6 is a control program flowchart for the microcontroller imbedded in the CPE unit of FIG. 4.

FIG. 6 is a high level program flowchart for microcontroller 520 of FIG. 5C. This control program is implemented in machine language at assembly language level and used to control the operations of the CPE unit, as previously discussed above. Power up of the CPE as shown at position 601 of FIG. 6 is invoked by sensing an off hook condition on the customer premises telephone equipment. Control is passed to the MICRON program at location 602 which is a microprocessor initialization routine. This routine configures the I/0 ports and disables all interrupts until the port configuration is complete. Disabling the interrupts will prevent any false interrupts from occurring until the program is ready.

Control is then passed to the RAMCLR routine at location 603. The purpose of this routine is to initialize the internal RAM locations with 00H (all numbers designated with an H suffix indicates hexadecimal numbers). The internal RAM is location within microcontroller 520 and addresses $0010H through $007FH.

Control is then passed to the routine LCDINIT at location 604 of the control program flowchart of FIG. 6. This routine provides for initialization of the LCD driver chip 521 which in turn control LCD display 522. This chip 522 contains internal shift registers and input control logic which requires resetting before use. This routine also insures that the LCD display 522 is blanked upon initialization.

Control is then passed to the decision box 605 which inquires whether there is a low battery condition. The program of the microcontroller checks the condition of the batteries every time the unit is powered up in response to the off-hook condition. The microprocessor looks at the LOW BAT signal input to see if the nine volt battery requires replacement. If this line input is LOW, then the nine volt battery is at or below the voltage level which is required to maintain reliable operation. If this is indeed a low battery condition, control is passed to location 606 in the flowchart where a low battery flag LBFLG is set which in turn initiates an enunciator to alert the user to the low battery condition. In addition, the LCD display can be used to display the low battery condition with an appropriate visual indicator.

After testing low battery condition, control is passed to location 607 regardless of the battery condition. When the low battery annunciator lights for the first time, the CPE battery can still operate the unit properly for some period of time. That is, the CPE will attempt to operate with a low battery. At location 607, routine UART is invoked to receive the incoming information message which is being sent at 1200 baud. This information message contains the telephone number of the calling party which will need to be decoded and displayed for the user. This routine includes the enabling of an 800 millisecond programmable timer which is an integral part of microcontroller 520. If a start bit indicating the beginning of a message to be received is not sensed within the 800 millisecond time window, as tested by time out test decision box 608, the program jumps to the DASHES routine at location 609.

The DASHES routine is called if the microcomputer does not receive the information message containing the calling party's telephone number. The DASHES routine simply commands the LCD driver 521 to display ten dashes on LCD display 522 to indicate to the user that no incoming message was received. After the dashes are displayed on LCD display 522, control is passed to SLEEP routine 615.

The purpose of the SLEEP routine is to shut off the PWR1 and PWR2 flags produced by microcontroller 520. As previously described in conjunction with FIGS. 5A through 5D, the PWR2 flag shuts down the circuitry of the CPE to conserve battery power in a load shedding operation. The microprocessor also executes the stop instruction, which puts itself into a low power mode of operation. The only circuitry remaining powered is the LCD driver 521 and the LCD display 522. Thus, all the while the telephone is off hook, the LCD display is either displaying dashes from the DASHES routine or the telephone number of the calling party.

Referring once again to decision box 608, if information is received from the telephone lines before the 800 millisecond time out, control of the program is passed to location 610. At this location, the routine NIBEXCG performs a nibble exchange on the incoming data. The nibble exchange is a data conversion routine which collects serial data and formats it for display on LCD display 522 by the LCD driver 521.

After the data is formatted, control is passed to location 611 for the routine NANICHK. This routine reads the formatted data received from the telephone line to determine if a NANI signal was sent. The NANI signal indicates that no automatic number identification (NANI) is possible for a variety of reasons (for example, an unassigned or unlisted directory number). The incoming data contains CCH hexadecimal data for each byte corresponding to the no ANI flag.

After the incoming data is checked for the NANI flag, control is passed to decision box 612 which determines whether no ANI data can be displayed. If the NANI flag was available, control is passed to the DASHES routine 613 which, as described above, displays ten dashes on the LCD display 522. Control is then passed to SLEEP routine 615 which once again puts the CPE into sleep mode where only the LCD driver 521 and the LCD display 522 remain powered up for the duration of the off hook condition.

If the incoming data did not contain the NANI flag, control is passed from the NANI decision box 612 to the display box 614. The reformatted data is serially passed to LCD driver 521 in the display control routine at location 614. The LCD display 522 then displays the telephone number and equipment type of the calling party. Once the LCD display 522 is invoked, control is passed to SLEEP routine 615 which once again powers down the remaining circuitry of the CPE. Termination of the SLEEP routine as shown in FIG. 6 is accomplished with the user placing the telephone equipment on hook. As described above, the on hook condition completely powers down the entire CPE.

CENTRAL OFFICE REVERSE ANI EQUIPMENT

Figure 7:
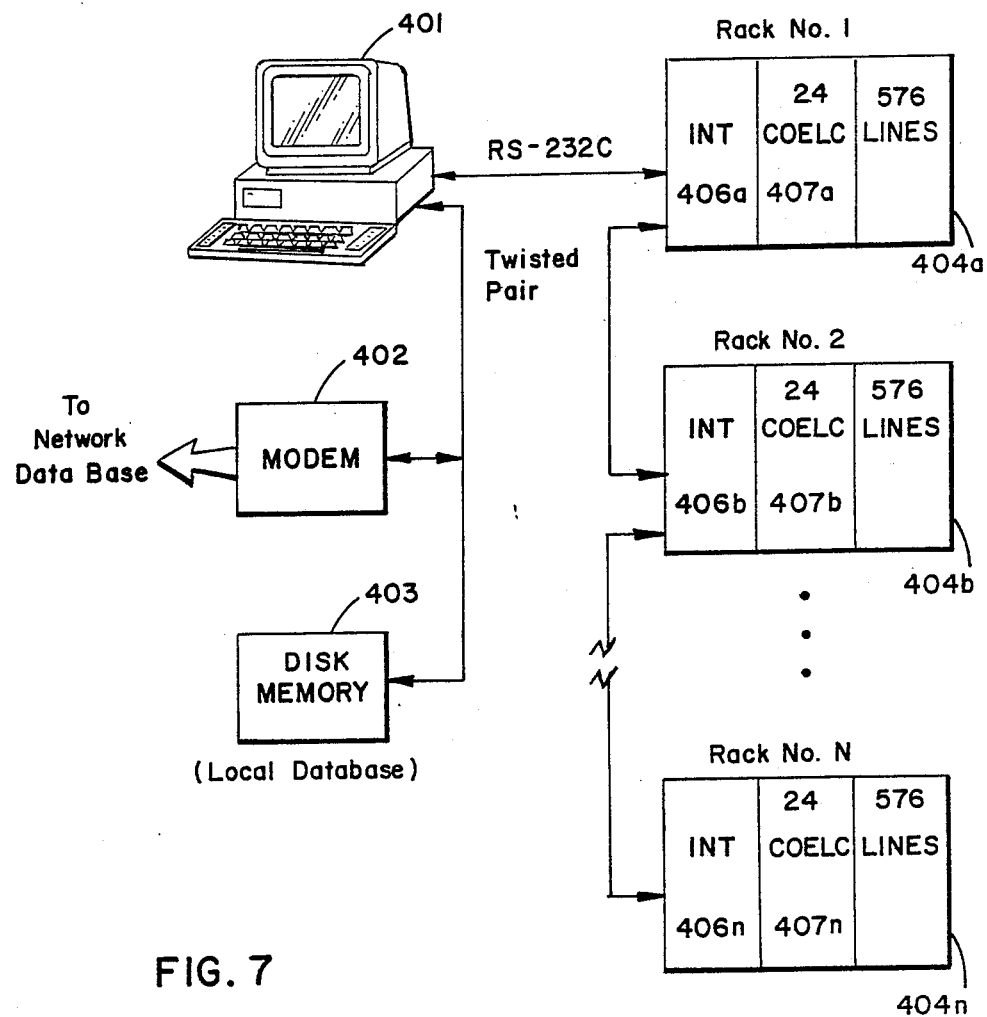
FIG. 7 is a block diagram of the central office equipment (COE) used in the reverse automatic number identification system.

FIG. 7 shows the block diagram of the central office equipment (COE) of the reverse ANI system of the preferred embodiment of the present invention. The system is composed of a number of racks 404a-404n which are assembled in the central office near the switching equipment. Each rack contains 24 line cards 407a-407n (each COE line card generally referenced as 407), each line card 407 capable of servicing 24 customer telephone lines. Thus each rack services 576 telephone lines, in the preferred embodiment. The 24 central office equipment line cards (COELC) 407 within each rack are all connected to a single interface card (INT) 406a, as shown in rack No. 1, 404a. All of the racks 404a-404n each contain interface cards 406a-406n (generally referenced as 406) which are serially connected along a serial communications path comprised of twisted pair wire. The interface cards 406 thus form a daisy chain of communication paths which transfer information down-line and up-line as requested to service the COELC 407 cards in each rack.

The system is designed to be implemented and to operate transparent to the operation of the telephone company switching equipment and the customer telephone lines. Each incoming telephone line serviced by a COELC 407 is broken using a conventional connector with the COELC 407 forming an interface at the broken connection. Thus, the COELC 407 is inserted between the tip and ring wires of the central office switching equipment and the tip and ring wires of a plurality of incoming subscriber lines. This type of interconnection can be made using half-tap connectors which ensure that the central office equipment is not interrupted. When the system is ready to be powered-up, the cut is made in the half-tap connectors for cut-over.

Each COELC 407 will interface 24 separate lines. An on-board microcontroller monitors each line for signalling and data. Transmit and receive functions for each line are multiplexed. The COELC memory will contain user status and telephone numbers of each telephone line serviced by each line card 407.

For system operation, a COELC must be located at both the originating and the terminating central office locations. Each line card 407 may operate either in originating or terminating mode. In originating mode, the COE line card 407 monitors the line for a request to send (RTS) signal from the terminating COE line card. The requested data (originating subscriber telephone number) is then sent to the terminating CPE. In terminating mode, the COE line card generates the RTS data when the terminating subscriber comes off-hook to answer a call. Data from the originating COE line card is passed to the terminating CPE if valid. Thus, the COELC may function both as originating and terminating unit if both subscriber lines are connected to the same line card. If both subscriber lines are connected to the same central office, two COE line cards within one central office location will handle the communication.

As shown in FIG. 7, each rack includes an interface card 406 which services 24 COE line cards 407. The purpose of the interface card is to provide a communications link from a host computer 401 to each COE line card in the rack. If a central office has one rack, the interface card in this rack is connected to the host computer via an RS-232C link. If a central office has more than one rack, one of the interface cars is connected to the host computer via an RS-232C link and the remaining interface cards in the computer are connected to the first interface card by daisy chaining, as shown in FIG. 7. This daisy chaining procedure is done using twisted pair lines on the back plane of the racks. Each interface card has a means to designate it as receiving RS-232C data levels or TTL levels signals, as described below.

When the system is installed, the host computer can be connected to a database network via a modem 402. With this connection, a remote computer (not shown) can down-load information through the interface cards to all COELC microcontrollers in an entire rack, a given shelf, or even for a specific line on a COELC. The down-loading can also be done locally from the host computer. The host computer has software which enables the telephone company to down-load files which contain user telephone numbers and the associated status.

In an alternate embodiment, the host computer has a local database on disk memory 403 which contains all the necessary telephone numbers as assigned to the telephone lines serviced by the COE line cards. In this fashion, an external database link is not required. The purpose of the database is to initialize the COE line cards on power-up with the appropriate telephone numbers. The use of a host computer to store the telephone numbers allows flexibility in the assignments of telephone numbers which can change quite often as subscribers change telephone locations.

Figure 8:
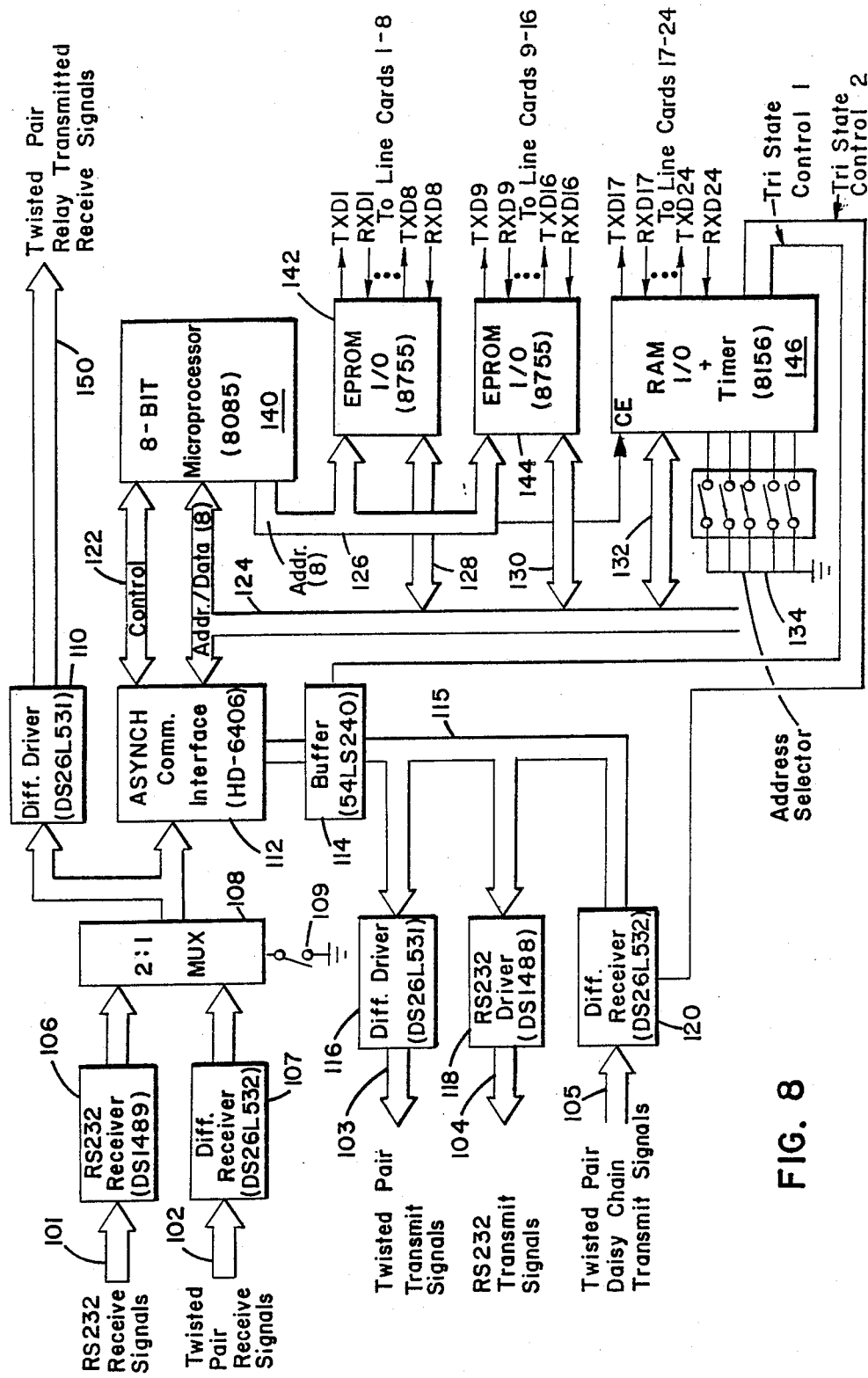
FIG. 8 is a simplified electrical block diagram showing the structure of an interface card of the central office equipment.

FIG. 8 is an electrical block diagram of a central office interface card 406 of the type used in the racks 404 of FIG. 7. Several options in cabling are available, as shown on the left of FIG. 8, allowing for RS-232C connections or twisted pair connections for both transmitting or receiving data. The RS-232 receive port 101 is used to receive data signals from the host computer when the interface card 406 is configured as the first card in the daisy chain. If the interface card is at a second or subsequent location in the daisy chain, the incoming data signals will be along twisted pair receive port 102. Incoming data signals on port 101 are received through RS-232 transmission line receiver 106 which is in the preferred embodiment part No. DS1489 available from National Semiconductor and other vendors. Incoming data signals along the twisted pair receive port 102 are received by differential line receiver chip 107 which in the preferred embodiment is part No. DS26LS32 available from National Semiconductor and other vendors. The received data signals from either the RS-232 port 101 or the twisted pair incoming port 102 are selected by two line to one line multiplexer 108. The selection of which incoming port is to be received by the interface card is selected by switch 109 which in the preferred embodiment may be a jumper wire on the interface card. Since the location of the interface card in the daisy chain is fixed at installation, switch 109 is fixed in a position to select one of the two incoming data paths. After initial positioning in the interface card and selection by switch 109, the interface card is hard wired to its position in the daisy chain.

Incoming data received either from port 101 or port 102 is taken from the output of two line to one line multiplexer 108 and immediately transmitted through differential line receiver 110 which in the preferred embodiment is part No. DS26LS31 available from National Semiconductor and other vendors. The output of differential driver 110 is placed on a twisted pair output port 150 to be relayed to the next interface card on the adjacent rack. In this fashion, any data transmitted from the host computer is immediately transferred along the entire daisy chain of interface cards and simultaneously available to all cards.

Data transmitted by the host computer and received by the interface card through two line to one line mux 108 is captured by the programmable asynchronous communications interface chip 112 which in the preferred embodiment is part No. HD6406 available from Harris Semiconductor and other second source vendors. The serial data received from input ports 101 or 102 is formatted into 8 bit bytes and placed on address-/data bus 124 to be received by the 8 bit microprocessor 140. Microprocessor 140 in the preferred embodiment is an Intel 8085 microprocessor, also available from a wide variety of second sources. Those skilled in the art will readily recognize the fungable characteristics of these types of microprocessors and thus will recognize that a wide variety of microprocessors may be used in this application without varying from the spirit and scope of the present invention.

Formatted data received from the interface card along address/data bus 124 is checked by microprocessor 140 to determine if the data is meant for the present interface card. If the data contains an identification code which indicates the data is bound for one of the 24 line cards 407 controlling one of the 576 telephone lines, microprocessor 140 will store the block of incoming data in RAM, I/0, and timer chip 146. This combined function chip in the preferred embodiment is an Intel 8156 also available from a wide variety of second sources. The incoming data is buffered and stored in RAM, I/0, and timer chip 146 until microprocessor 140 can communicate with the destination line card to download the data.

The address of the interface card is determined by address selector dipswitch 134 which is used to hardware select and fix the address of the present interface card and communicate this address to RAM, I/0 and timer chip 146. Microprocessor 140 reads the switch positions of address selector 134 and compares this binary address to the destination address of the incoming data to determine if that data is bound for the present interface card. Only a five position address selector switch is required, since the maximum number of tip and ring wire pairs for incoming telephone lines for a single central lines is 10,000. Since each interface card communicates with 24 line cards, which each in turn controls 24 telephone lines, each interface card directly services 576 telephone lines. Therefore, the maximum number of interface cards required by a single central office is 18 and a five position dipswitch can uniquely identify 32 separate interface cards. A unique address for each interface card is programmed onto address selector 134 at the time the interface card is installed in each rack along the daisy chain.

Two EPROM and I/0 chips 142 and 144 are addressed using the lower 8 bit addresses through buses 128 and 130 attached to address/data bus 124 and additionally require the upper 8 addresses available on address bus 126. Thus, the control memory for microprocessor 140 is contained in erasable PROM memories 142 and 144 in the upper address area. Chips 142 and 144 are combined EPROM and I/0 chips, each of which provides two bidirectional 8 bit ports which are each used in dedicated transmit (TXD) or receive (RXD) mode to communicate to 8 line cards apiece. Thus, chip 142 communicates to line card numbers 1 through 8 through transmit lines TXD1-TXD8 and the receive data lines RXD1-RXD8. EPROM and I/0 chip 144 communicates to line card numbers 9 through 16 through transmit ports TXD9-TXD16 and receive ports RXD9-RXD16. RAM, I/0 and timer chip 146 has two programmable 8 bit I/0 ports and one programmable 6 bit I/0 port. The 8 bit ports are used to communicate with line card numbers 17 through 24, along transmit ports TXD17-TXD24 and receive ports RXD17-RXD24. The remaining 6 bit I/0 port of chip 146 is used to read the switch positions of address selector 134 and to control tri-state control lines number 1 and 2 (which are mutually exclusive lines controlled from a single port, one line being the inverse of the other).

Thus, with the multiple function chips 142, 144 and 146, microprocessor 140 can effectively communicate with 24 line cards to either transmit or receive data from the line cards.

Bidirectional communication is also possible between the interface cards and the host computer. As was described above, data transmitted from the host computer can be received along an RS-232 port 101 and retransmitted to the other interface cards on the daisy chain out of twisted pair port 150. Interface cards in subsequent positions along the daisy chain receive the host computer data through twisted pair port 102. It is possible for the interface cards to originate information (such as acknowledgement signals, requests for retransmission due to error, etc.). Information to be sent to the host computer by the microprocessor 140 is sent through asynchronous communications interface 112 where it is placed on outgoing communication bus 115 buffered by tri-state driver chip 114 which in the preferred embodiment is a 54LS240 buffer and driver chip available from National Semiconductor and other vendors. Outgoing information from microprocessor 140 is placed on outgoing bus 115 where it is simultaneously applied to the differential driver chip 116 or RS-232 driver chip 118 which in the preferred embodiment is part No. DS1488 available from National Semiconductor and other vendors. Depending on the location of the interface card along the daisy chain, the data will then be transmitted out twisted pair port 103 (if the interface card is located in the second or subsequent position along the daisy chain) or out RS-232 port 104 (if the interface card is directly connected to the host computer).

Data for the host computer which is sourced from an interface card somewhere down the daisy chain from the interface card shown in FIG. 8 is received along twisted pair daisy chain port 105 and received through differential receiver chip 120. This data is then received and placed on bus 115 where it is immediately retransmitted to interface cards higher in the daisy chain through twisted pair output port 103 or to the host computer directly through RS-232 port 104 (only if the interface card of FIG. 8 is directly connected to the host computer).

In order to prevent data collisions from occurring on bus 115, the outputs of differential receiver chip 120 are tri-state controlled through tristate control line number 2 sourced from RAM, I/0 and timer chip 146. Buffer 114 is also a tri-state buffer chip under control of tri-state control line number 1, also sourced from chip 146. Tri-state control line number 1 and tri-state control line number 2 are mutually exclusive in that both tri-state drivers within chips 120 and 114 cannot both drive bus 115 at the same time. In this fashion, data collisions are avoided. The control of tri-state line numbers 1 and 2 are under direct control of microprocessor 140. The position of the tri-state drivers in chips 114 and 120 are determined by microprocessor 140 depending on whether the present interface card wishes to transmit data up the daisy chain to the host computer or whether the interface card is positioned merely to relay the information from a subsequent interface card up to the host computer. To avoid bus contention using this daisy chain technique, commonly known protocols are used to avoid bus conflicts.

Those skilled in the art will readily recognize that the interface card described above can be implemented in a wide variety of techniques in order to accomplish the stated goal. The host computer is used to keep an updated directory of the telephone numbers assigned to the telephone lines within the central office. For the convenience of the telephone company in assigning and changing telephone numbers, this information is centrally stored instead of permanently distributed throughout the reverse automatic number identification system of the present invention. However, those skilled in the art will readily recognize that a wide variety of implementation schemes are possible for communicating or broadcasting the necessary directory numbers to the interface cards or directly to the line cards without using the technique described according to FIG. 8. In an alternate embodiment, the directory numbers of the telephone lines controlled by the line cards could be permanently or semi-permanently encoded into the line cards at installation time, thereby eliminating the need for a host computer and various interface cards.

Figure 9:
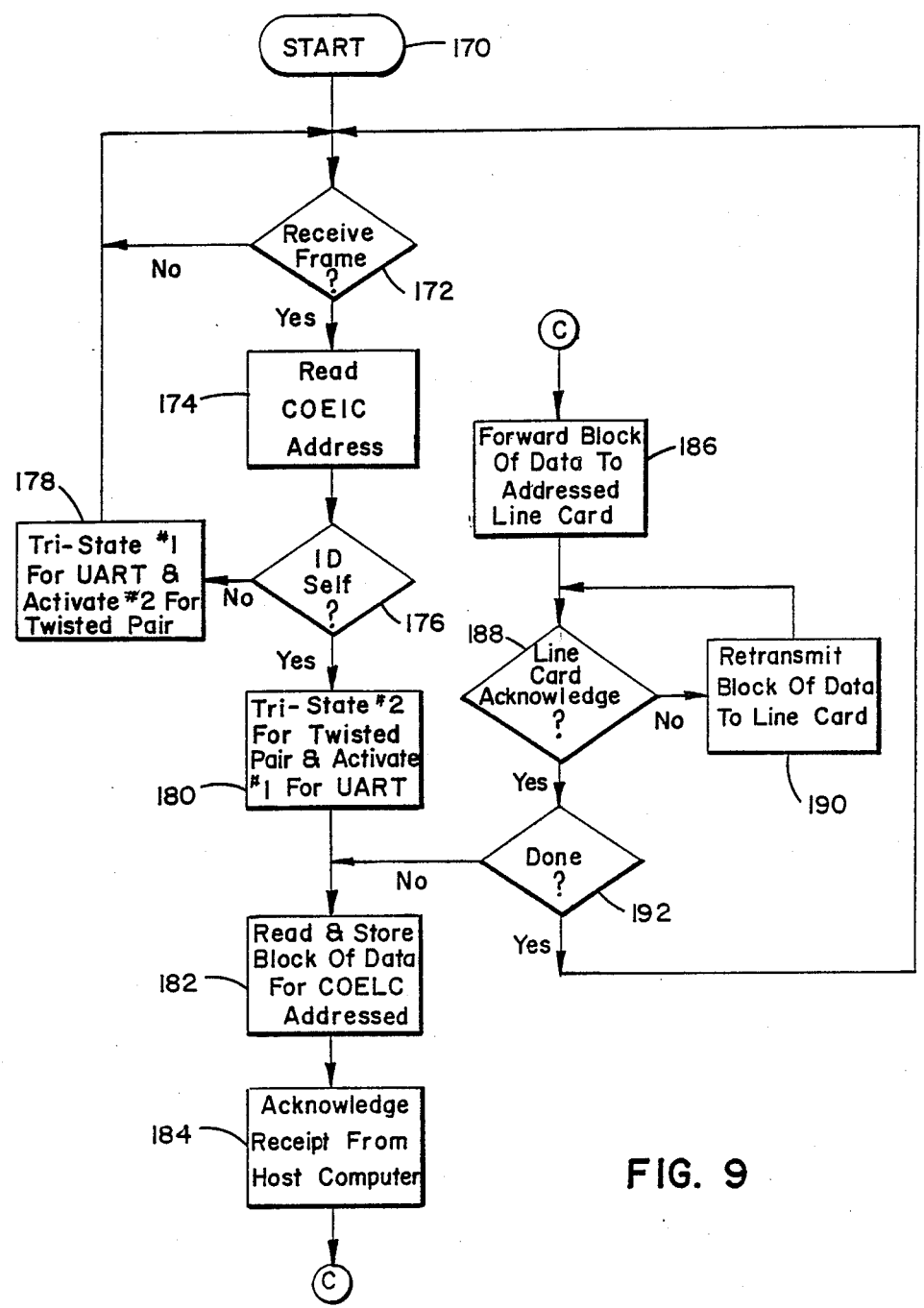
FIG. 9 is a control program flowchart for the microcontroller in one of the COE interface cards of FIG. 8.

FIG. 9 is a simplified flowchart of the operation of microprocessor 140 within the interface card for controlling the distribution of directory numbers from the host computer to the line cards. Entering the flowchart at the start location 170, a main idle loop is defined by decision box 172. The microprocessor is in a constant ready state, waiting for information to be received from either the RS-232 input port 101 or from the twisted pair input port 102. As long as no information or data is received on these ports, the microprocessor will continually wait in an idle state for information to be detected.

As soon as a data frame is received, control is passed to location 174 in the control program shown in FIG. 9. As the information is received, the central office interface card address is taken from the first data block and compared against the local address of the present interface card. This decision in box 176 determines whether the identification address of the incoming data matches that of the present card. If there is no match, the data was not intended for the present interface card and it is ignored. Control is then passed to box 178 where tri-state line number 1 causes buffer chip 114 to go into a tri-state condition and tri-state line number 2 is activated for allowing data on the twisted pair port 105 to be passed through differential receiver 120 and placed on data bus 115 for retransmission up the daisy chain. This is the normal state of the tri-state line numbers 1 and 2 to allow communication from the interface cards up the daisy chain to the host computer so that an inactive or idle interface card does not interfere with communication to and from the host computer. Control is then passed back to the idle loop where the interface card continually monitors the data passing to determine if the incoming data contains an address which matches the local address of the present interface card.

Returning once again to decision box 176, if the address of the incoming data matches the present interface card address, control is passed to box 180 where the tri-state control lines change state to reconfigure the response communication bus 115 to allow the microprocessor 140 to communicate back to the host processor. Tri-state line number 2 deactivates the differential receiver 120 and activates tri-state buffer 114 so that the asynchronous communications interface chip 112 can control outgoing bus 115.

After the tri-state drivers are reconfigured, control is passed to box 182 where the incoming data or block of data is stored in memory 146 for later retransmission to the appropriate line card. In the preferred embodiment of the present invention, one block of data at a time is stored and then passed off to the appropriate line cards. Those skilled in the art will readily recognize that a plurality of data buffering and retransmission schemes could be accomplished, including direct communication between the host computer and the line cards to allow efficient transfer of directory data. In the preferred embodiment of the present invention, however, one block of data at a time is stored by microprocessor 140 into RAM chip 146 where it is buffered until the microprocessor 140 is ready to transfer the data to the appropriate line card.

Once the data has been stored, control is passed from box 182 to box 184 where microprocessor 140 acknowledges the receipt of the data from the host computer by transmitting an acknowledge signal through asynchronous communications interface chip 112 onto either the twisted pair output port 103 (if this interface card is in the second or subsequent position of the daisy chain) or out RS-232 port 104 (if this interface card is the first interface card in the daisy chain).

After acknowledging receipt of the data, control is passed to box 186 where the microprocessor decodes the address of the line card to which the data has been assigned and forwards the block of data to the addressed line card. This action requires that the microprocessor 140 determine to which line card to transmit the data and thus which output port controller is required to accomplish the task. Referring briefly to FIG. 8, three chips 142, 144 and 146 are possible candidates for directly communicating with one of the 24 line cards. The microprocessor determines which interface chip is required to communicate and then downloads the information from RAM chip 146 to the appropriate data port. After communication of the block of data, control is passed to decision box 188 where microprocessor 140 waits for a brief period until the line card acknowledges receipt of the data. If the data is not acknowledged or if a return error signal is received from a line card, control is passed to box 190 where the microprocessor retransmits the block of data to the line card. Two way communication is possible between the line cards and the interface cards to determine if the appropriate data has been received and to request further information due to errors, maintenance information, etc.

Once the line card acknowledges receipt of the data, control is passed to decision box 192 where microprocessor 140 determines whether all of the requisite data has been received from the host computer. If the data transfer is incomplete, the decision box 192 transfers control to box 182 where the microprocessor proceeds to read and store additional blocks of data from the host computer. If all of the requisite data has been downloaded via the interface card to the appropriate line cards, control is passed back to the idle loop at decision box 172 where the microprocessor enters a continuous wait loop, looking for blocks of data having interface card addresses matching itself.

Those skilled in the art will readily recognize that a wide variety of control programs can be used to transfer information from the host computer to the appropriate line cards. The foregoing description of the control program is merely exemplary and not limiting.

Figure 10:
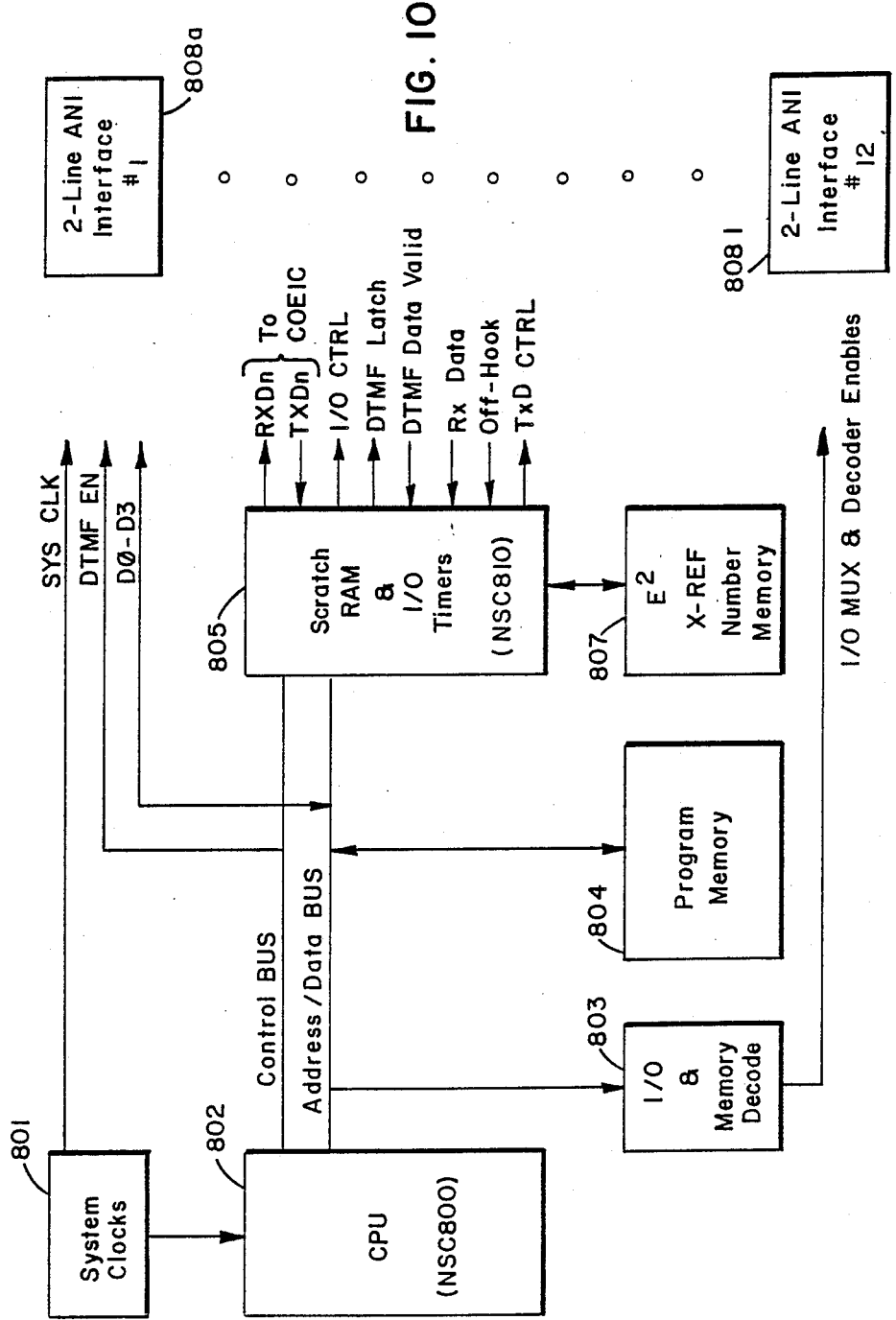
FIG. 10 is a simplified electrical block diagram of the microprocessor control portion of a central office equipment line card.

FIG. 10 is a simplified electrical block diagram of the microprocessor control portion of a typical line card used to control 24 subscriber telephone lines. A simple, inexpensive, 8 bit microprocessor 802 is used as the heart of each line card. This microprocessor in the preferred embodiment is an NSC 800 available from National Semiconductor and other vendors. A sister chip 805 is also used which provides a wide variety of functions, including a scratch pad memory, I/O and various programmable timers. In the preferred embodiment, this chip is an NSC 810, also available from National Semiconductor. The use of the NSC 800 and the NSC 810 together provide a nearly complete microprocessor or microcontroller system on two chips. Additional I/O control is provided by simple buffer chips 803 driven directly off the combined address and data bus. Additional program memory is stored in PROM or ROM, as shown in box 804. A non-volatile electrically erasable memory 807 is attached to scratch pad memory 805 to store the directory number list assigned to the 24 subscriber telephone lines controlled by the present line card.

As shown on the right of FIG. 10, 12 subportions of each line card are described, each of which controls two telephone lines. These two line ANI interfaces 808A–808L are directly controlled by the I/O mux and decoder enables lines and indirectly controlled by the various control lines attached to chip 805. A crystal controlled system clock 801 is used to clock microprocessor 802 and to synchronize the DTMF transceiver (discussed below).

Figure 11:
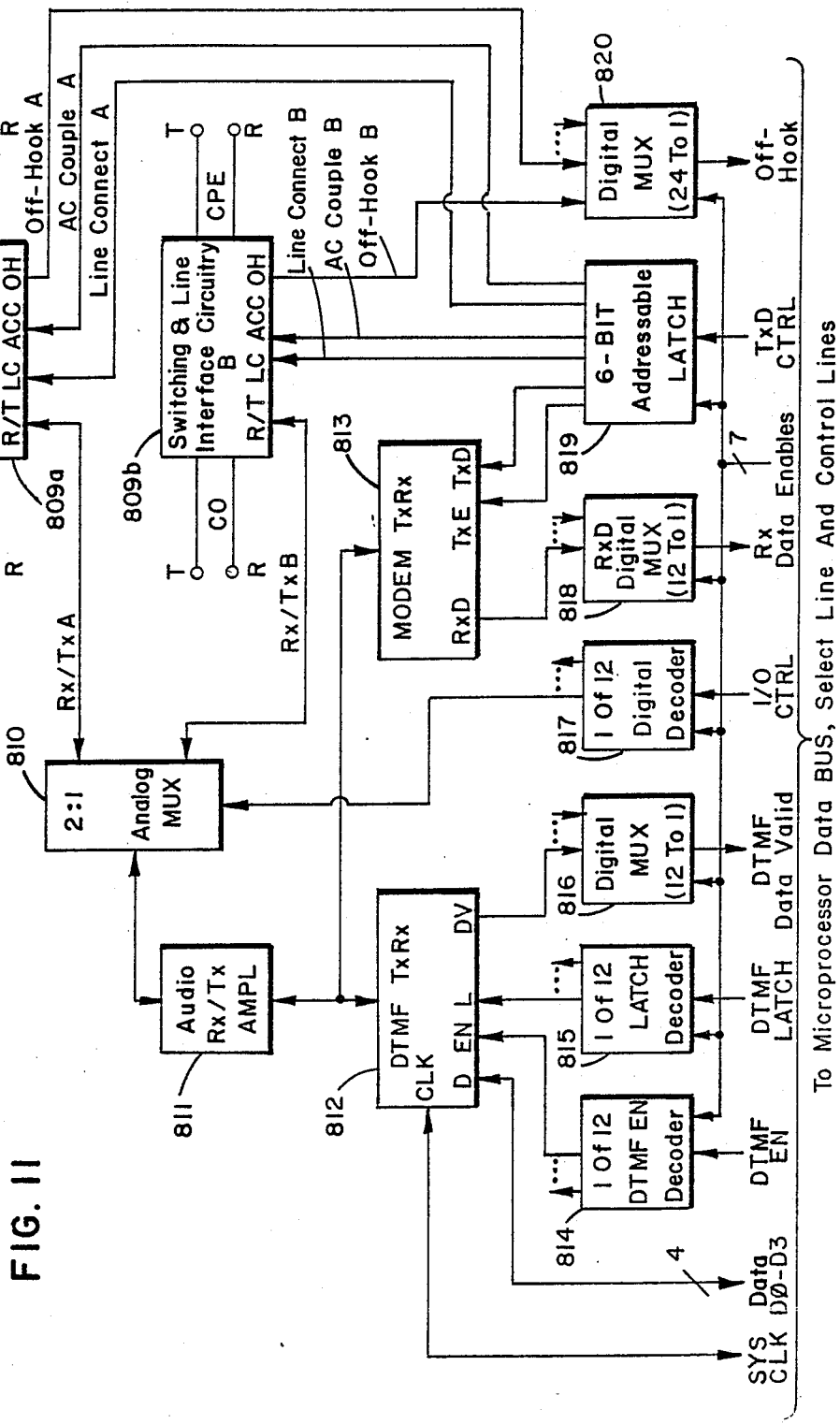
FIGS. 11, 12 and 13 are detailed electrical schematic diagrams describing the communication control circuitry of the COE line cards.

A detailed electrical block diagram shown in FIG. 11 shows the typical connection of the digital control lines between the microprocessor system of FIG. 10 and the switching and line interface circuits 808A–808L used to control each subscriber telephone line. Since a single microprocessor system is used to control 24 subscriber telephone lines, multiplexing and decoding of digital control lines is necessary to time-multiplex the operation of the system. Those skilled in the art will readily recognize the required detailed implementation of the decoder and multiplexer circuits shown in block form in FIG. 11.

Digital decoders 814, 815, 817, digital multiplexers 816, 818, and 820, and addressable latch 819 are all time multiplexed by a plurality of enable signals shown on the bottom of FIG. 11 and connected to the I/O and memory decode circuitry 803 of FIG. 10. CPU 802 directly controls the time multiplexing of the signals produced by memory and I/O chip 805 for use by the line interfaces 808A–808L through the I/O MUX and Decoder Enables lines from memory decode chips 803. Those skilled in the art will readily recognize the detailed electrical connection and multiplexing of these signals.

Referring to FIG. 11, the off hook signal is produced by each switching and line interface circuit. Since each line card can service 24 subscriber telephone lines, 24 off hook signals can be produced for a single line card. Two of these switching and line interface circuits 809A and 809B are shown in FIG. 11 which correspond to the two line ANI interface 808A of FIG. 10. Each two line ANI interface 808 includes two switching and line interface circuits 809a and 809b, a two-to-one analog mux 810 for multiplexing transit and received data, an audio receive and transmit amplifier 811 connected to a DTMF transmitter/receiver 812 and a transmitter/receiver modem 813, and a single 6-bit addressable latch 819. The foregoing circuitry corresponds to a single two line ANI interface 808A–808L of the type shown in FIG. 10. The control signals and data signals for each two line ANI interface are all time multiplexed or decoded by the control circuitry shown on the bottom of FIG. 11.

A single off hook signal is generated by each switching and line interface circuit to indicate that servicing is required of the corresponding subscriber telephone line. Twenty four off hook signals are generated for a single line card, all of which are digitally multiplexed by digital mux 820 shown in FIG. 11. The polling of the off hook signals is accomplished by sequentially stepping the digital mux through the 24 signals and monitoring for a short period of time the output of the digital mux. This stepping of the digital mux through the signal lines is accomplished by the enables signals generated by I/O and memory decode circuit 803 in FIG. 10.

Control of the relays (shown in FIG. 12 and discussed below) in the switching and line interface circuits 809a and 809b is accomplished by the TxD CTRL control signal generated by the scratch pad memory and I/O timer chip 805. This signal is directed to the appropriate switching and line interface circuits to control the relays by means of a 6-bit addressable latch 819 for each two line ANI interface. A TxD CTRL control signal directed to a specific switching and line interface circuit is first captured by the 6 bit addressable latch 819 into the appropriate location controlled by the enables. The TxD CTRL control signal controls the line connect relay and the AC couple relay of each switching and line interface circuitry, the details of which are discussed below. In addition, for each two line ANI interface 808A–808L, the transmit enable and transmit data signals for each modem 813 are directly controlled by the TxD CTRL control line through 6 bit addressable latch 819.

Data received from a subscriber's telephone line is routed from the switching and line interface circuit 809A along the Rx/Tx A signal line to the two line to one line analog mux 810. This same path is used for transmitting data to the subscriber's telephone line. Control of analog mux 810 is accomplished by means of the one line of twelve line digital decoder 817. This digital decoder controls the positions for receiving and transmitting data through the analog mux 810. Twelve analog muxes are used for a single 24 line COELC. The I/0 CTRL control signal from scratch pad memory and I/0 timer chip 805 controls the positioning of the analog muxs in conjunction with the enables signal.

The received data is passed from analog mux 810 to the audio Rx/Tx amplifier 811 where it is signal conditioned for reception. Depending on whether the data expected is DTMF tones or FSK encoded data, DTMF transmitter/receiver 812 or FSK transmitter/receiver modem 813 will be used, respectively. FSK digital data received by modem 813 is transferred to the RxD digital multiplexer 818 where it is combined with the 11 other modem signals from the 11 other two line ANI interfaces to be transferred along the Rx data line to the scratch pad memory and I/0 timer chip 805. The received digital data is then stored in memory and processed by the microprocessor of the line card. Control of digital multiplexer 818 for receiving the Rx data signals is under control of the enables line from chips 803. The timing of the enables control lines is critical to the operation of the line card in order to accurately service 24 lines from a single microprocessor. Those skilled in the art will readily recognize the prioritization of interrupts or polling required to effectively receive uninterrupted communication along one subscriber line while servicing a second or subsequent subscriber telephone line without undue delay.

Modem 813 in the preferred embodiment is an SSI223 1200 baud FSK modem available from Silicon Systems, Inc. of Tustin, Calif. Those skilled in the art will readily recognize the easy substitution of a wide variety of modems or data transmitters/receivers for the modem of 813. Modem 813 is also capable of transmitting digital data by means of the TxD CTRL control line, as described above.

If the received information is by frequency-shifted multifrequency DTMF tones, the DTMF transmitter/receiver 812 will be used. Determination of which type of incoming information is strictly controlled by protocol and as such the microprocessor of the line card expects either DTMF data or modem data within carefully prescribed time windows. The timing and control of the operation of the reverse automatic number identification system of the present invention has been generally described above in conjunction with FIGS. 1-3 and the detailed control operation of the microprocessor based line card as described below.

DTMF receiver chip 812 in the preferred embodiment is an SSI20C89 DTMF transceiver (Tx/Rx) chip available from Silicon Systems, Inc. This chip produces a 4 bit digital code corresponding to one of 16 multifrequency tones received. The tone signalling of DTMF transceiver 812 is purposefully shifted in frequency so as to not interfere with the normal assigned frequencies of the DTMF tones used for signalling and control in the telephone systems. An off-frequency crystal controls DTMF transceiver 812 to ensure this, the frequency of which is calculated to match the crystal controlled frequency of the CPE discussed above.

The 4 bit binary code corresponding to the one of 16 received tone pairs is transferred to the data bus of the microprocessor system along the lower bit addresses D0-D3. Operation of the DTMF transceiver 812 is synchronized with the system clock 801. Control of the DTMF transceiver 812 is by means of the DTMF EN enable control signal decoded by decoder 814. Also, DTMF LATCH control signal is used to latch the received data or transmitted data on data bus D0-D3 for use by DTMF transceiver 812. When in receive mode, the DTMF data is being decoded by transceiver 812, data on data bus D0-D3 is invalid until the DTMF data valid control signal is received. This signal is multiplexed on a twelve line to one line multiplexer 816 to inform the microprocessor that valid data has been received.

The audio Rx/Tx amplifier 811 and analog mux 810 are designed for bidirectional inband transmission and reception. Thus, the same signal path is used for both receiving and transmitting inband information.

Figure 12:
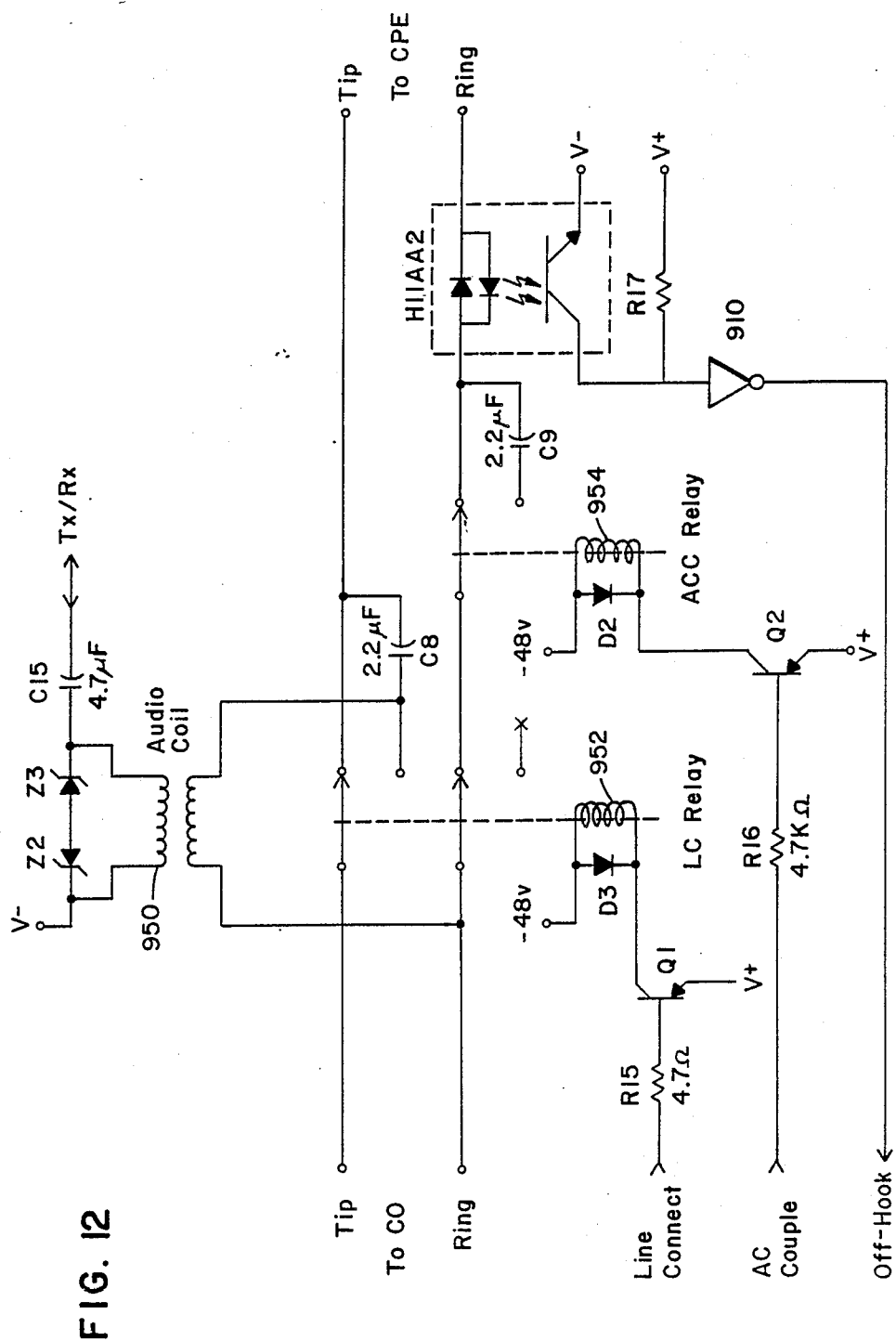
Figure 13:
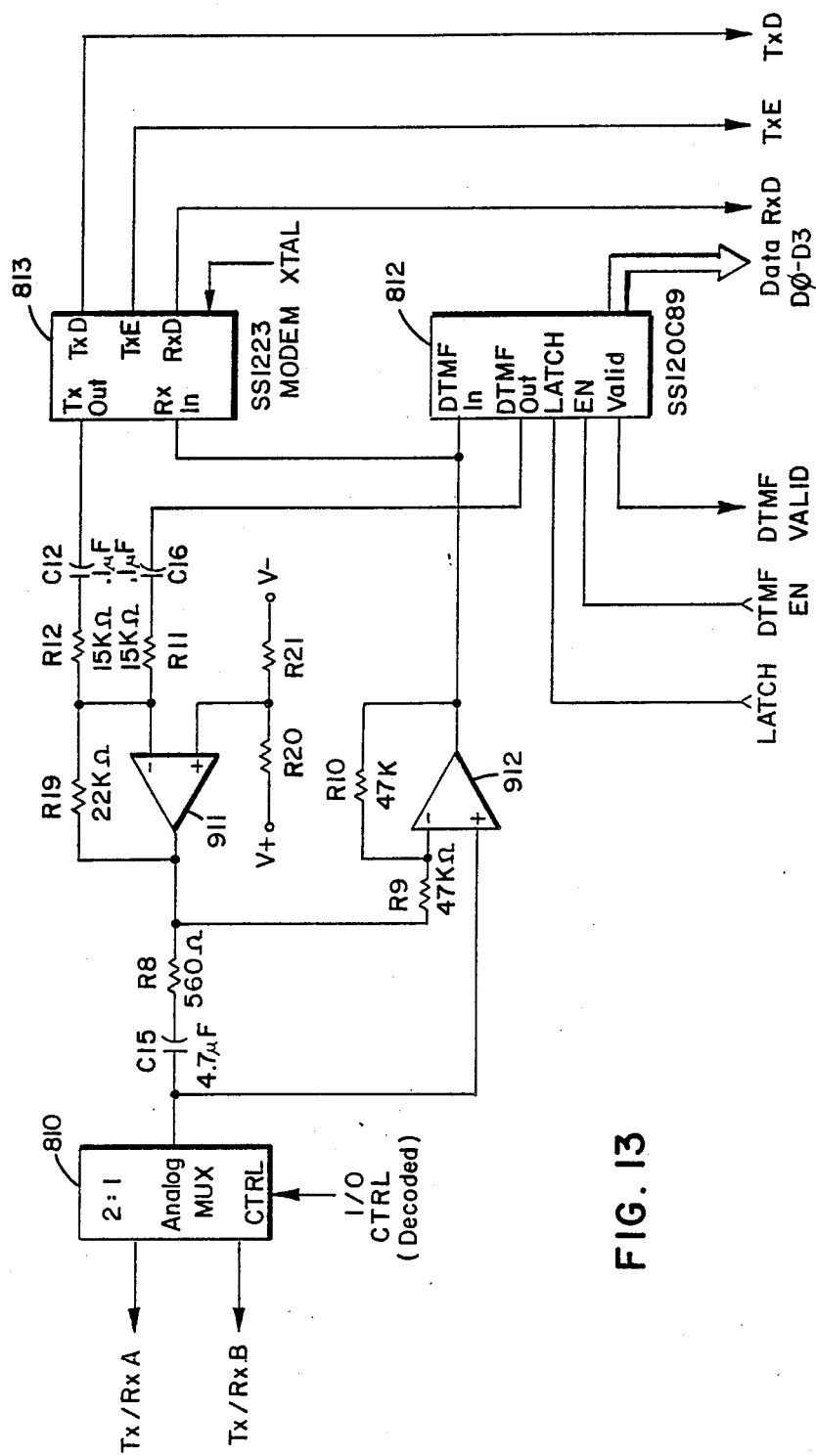

The detailed description of the switching and line interface circuits 809a or 809b is shown in FIGS. 12 and 13. Audio coil 950 of FIG. 12 can be inserted across the tip and ring wires of the central office connection of the subscriber line in one of two positions by operation of LC (line connect) relay 952. Latching and holding the LC relay (shown in the normally closed, at rest position in FIG. 12) in the open position is accomplished by the line connect signal which is generated by a 6-bit addressable latch 819. The TxD CTRL control signals are latched by addressable latch 819 and held until cleared so that the LC relay 952 i held until the latch is cleared. In the normally closed position of relay 952, the audio coil is placed across the tip and ring line connection to merely listen to data communication between the central office and the CPE. Data may also be transmitted onto the telephone line which then can be monitored or received by equipment connected on the central office side or the CPE side of the telephone line shown in FIG. 12. In this position of the relay, the impedance of the secondary of audio coil 950 is blocked by the 2.2 microfarad capacitor C8.

In the normally open position of relay 952, the audio coil is placed directly across the central office connection of the tip and ring wires of the subscriber's telephone line. The secondary of audio coil 950 provides an off-hook impedance to the central office switching equipment to keep the telephone line connected even though the CPE side of the subscriber's telephone line has been cut off. This position of LC relay 952 allows the transmission of data to the central office by the COELC without interference from the subscriber's telephone equipment on the CPE side of the subscriber's line. In some cases, such as a PBX environment, battery must be placed on the subscriber line so the subscriber does not see a transition.

The AC couple relay 954 is used to insert capacitor C9 into the ring wire connection between the central office and a CPE. The AC couple control line is latched and held by 6 bit addressable latch 819 in a manner similar to that of the line connect signal. ACC relay 954 is shown in its normally closed position. This relay functions in conjunction with the open position of LC relay 952 to allow audio coil 950 to communicate information to the CPE and/or remote COE when LC relay 952. This relay switches the 2.2-microfarad capacitor C9 in series with the ring line. This is done while the number information is being received by the originating CO modem. Its purpose is to block DC loop current to the CPE mouthpiece so that no noise can be injected during the above transmission.

Detecting the off-hook condition is accomplished through the use of optical coupler H11A2. Current passing in either direction along the ring wire of the subscriber's telephone lines will generate an off hook signal buffered by inverting buffer 910. The off hook signal is then sent to the microprocessor 802 through digital multiplexer 820 and scratch pad memory and I/0 timer chip 805, as was discussed above.

In another view of the transmission and reception of information from the subscriber's telephone line, FIG. 13 shows a more detailed view of the audio Rx/Tx amplifier 811 of FIG. 11. The analog multiplexer 810, the 1200 baud FSK modem 813 and the DTMF transceiver 812 operate according to the discussion given above. The audio amplification of transmitted and received digital of multifrequency tones is accomplished by means of a pair of operational amplifiers 911 and 912. These amplifiers are commonly available off the shelf devices available from a wide variety of vendors. Information received from analog multiplexer 810 is buffered through operational amplifier 912 and distributed both to DTMF transceiver 812 on the DTMF In input line and the Rx In input of the 1200 baud FSK modem 813. Information transmitted out analog multiplexer 810 is AC coupled through capacitor C15 from operational amplifier 911. Transmitted multifrequency tones from the DTMF transceiver 812 are limited and combined in a resistive summing bridge with the transmitted FSK data from modem 13 and applied to the inverting input of operational amplifier 911. The resulting bidirectional configuration allows transmission or reception of information without switching of amplifiers in and out of the communication path.

FIGS. 14 through 18 describe the detailed operation of the central office line card for the reverse automatic number identification system of the present invention. Control operation of the flowchart is accomplished through microprocessor 802 within each line card. The identical program is loaded into the ROM memory of each microprocessor based line card and each of the 24 line cards within each rack operate independently and simultaneously to service the 24 lines.

Figure 14:
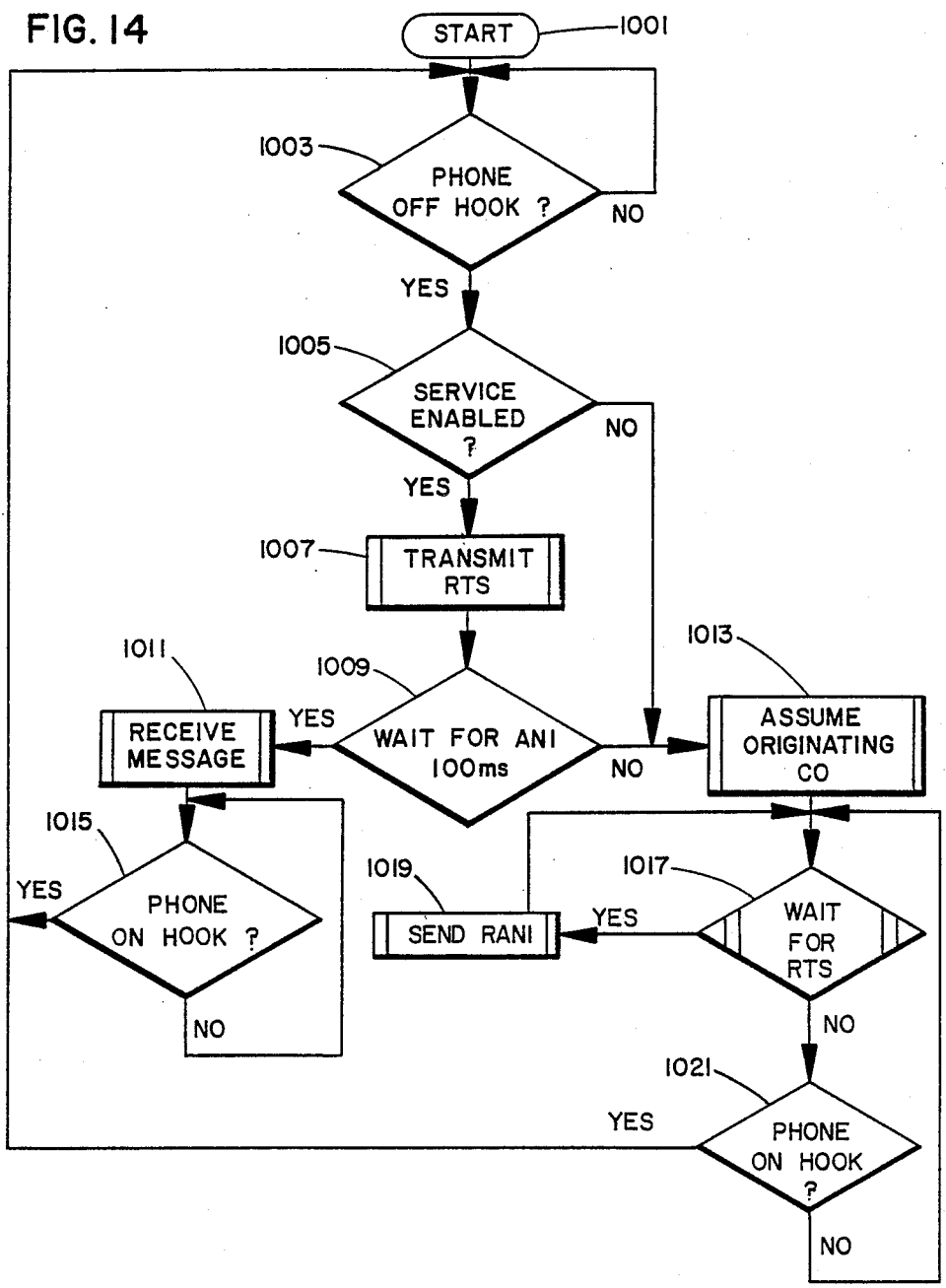
FIGS. 14, 15, 16, 17, 18A and 18B are detailed flowcharts of the microprocessor control of the COE line cards.

Beginning at start location 1001 of FIG. 14, the main idle loop is from decision box 1003 where the microprocessor based line card continually monitors each subscriber telephone line for an off hook condition. If no off hook condition is detected, the microprocessor continues to cycle in the idle loop. Once an off hook condition is detected on one of the subscriber lines, the microprocessor checks its local memory to determine whether the RANI service is enabled for this subscriber. This test at decision box 1005 would be necessary if the telephone company wished to charge a surcharge for subscribing to the RANI service. If a subscriber does not wish to subscribe to the service, the central office would transmit the subscriber's number to a remote CPE assigned to a subscribing consumer, but would not allow the reception of telephone numbers to the local customer if he or she were not a subscriber to the RANI service. Thus, if the service is not enabled at decision box 1005, control is passed to box 1013 where the line card assumes that the off hook condition was in response to an incoming telephone call and so the line card assumes that it is the originating central office. Thus, regardless of whether the customer is a subscriber to the RANI service, all telephone calls originated from this customer's premises will transmit the customer's telephone number to remote CPE units upon request.

Control is then passed to decision subroutine 1017 in which the line card waits for a valid request to send (RTS) signal. This decision subroutine is described in detail in FIG. 18.

Figure 18A:
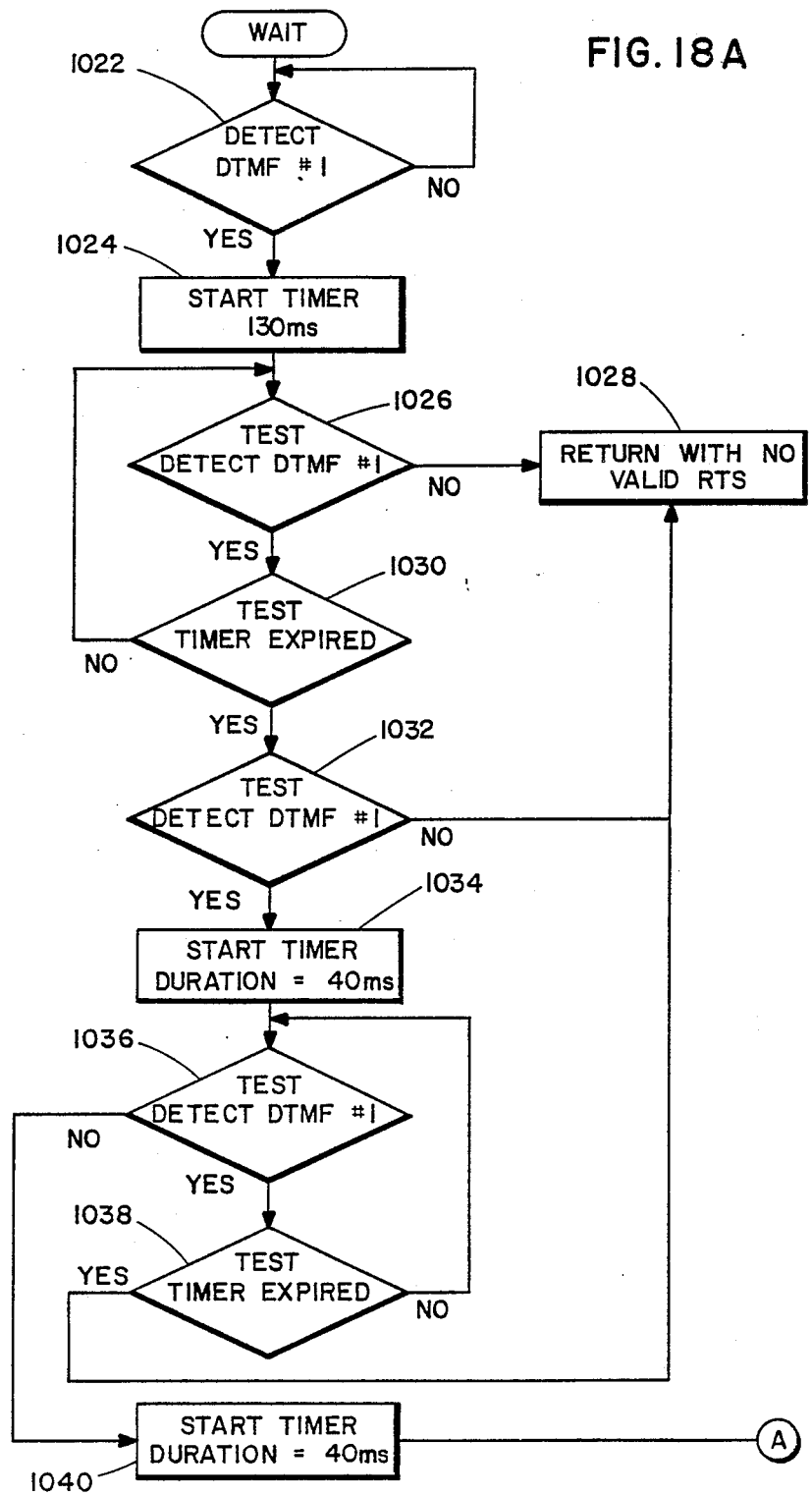
Figure 18B:
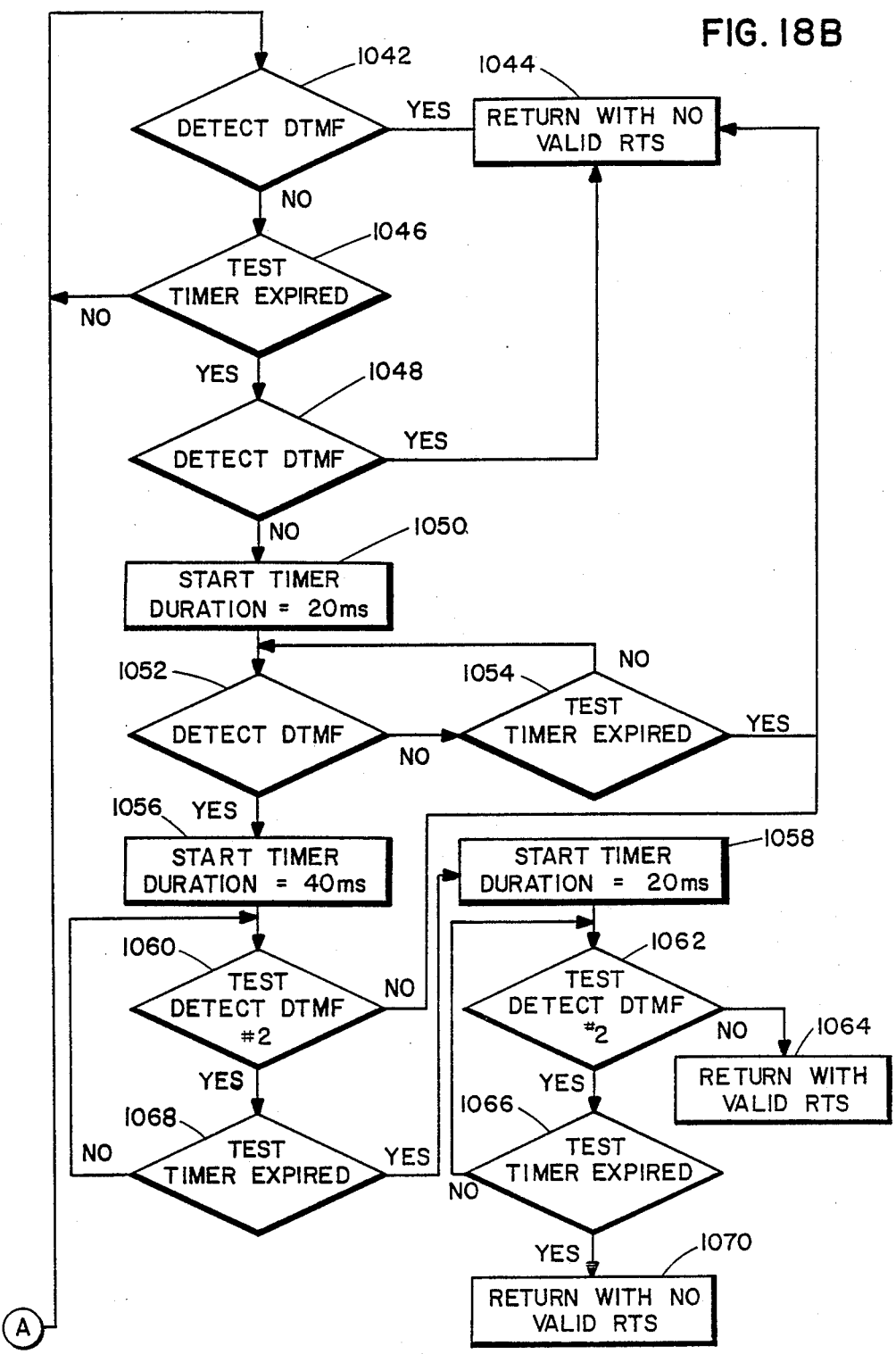

Referring to FIGS. 3 and 3A in conjunction with FIG. 18, the RTS signal is a dual burst of two tone pairs on the telephone line indicating a request to send. The first tone pair is a multifrequency type of a DTMF-shifted tone having a duration of 150 milliseconds ±20 ms. This tone pair is followed by a quiet interval of 50 milliseconds +10 ms which in turn is followed by a second tone pair transmitted for 50 milliseconds +10 ms. This specific tone pair signature is used to invoke the line card to transmit the local customer's telephone number of the calling party to the remote CPE. This signature is detailed so that noise or spurious tones on the telephone line during the use of the line will not trigger the line card to mistakenly transmit the local customer's telephone number.

The detailed flowchart of FIG. 18 is designed to detect only the tone pair signature described in the detail of FIG. 3A. An initial wait loop monitors the telephone line at decision box 1022 to detect the first DTMF tone pair. Once the initial edge of this tone pair is detected, control is passed to box 1024 where a 130 millisecond timer is started. Control is immediately passed to decision box 1026 to determine whether the first DTMF tone pair is still present. If the tone pair disappears before the elapsed time of 130 milliseconds, control is passed to return box 1028 which returns from this subroutine with a no valid RTS signal. Thus, if no valid RTS signal was received, no subscriber telephone number will be transmitted by the line card. If, however, the DTMF tone pair number one is still present out of decision box 1026, control is passed to decision box 1030 which tests whether the 130 millisecond timer has expired. Thus, during the 130 milliseconds, the loop comprised of decision boxes 1026 and 1030 insures that the tone pair number one must remain active for at least 130 milliseconds. If the timer expires before the tone pair number one disappears, control is passed to decision box 1032 to test whether the DTMF tone is still present. If the DTMF tone expires before or at 130 milliseconds, control is returned to the main routine of FIG. 14 with a no valid RTS response indicating that the tone pair signature was not correct. If, however, after the expiration of the 130 millisecond timer, the first tone pair is still present, a 40 millisecond timer is initialized at box 1034. Once this timer is initialized, control is passed to decision box 1036 to determine whether the DTMF tone pair number one has disappeared. If the tone pair is not detected within the 40 millisecond timer, control is passed to box 1040. If the timer expires before the tone pair disappears, control is returned to the main calling routine of FIG. 14 with a no valid RTS decision. If the tone pair is still valid during the duration of the 40 millisecond timer, control is continually looped between decision boxes 1036 and 1038 until either the tone pair disappears or the timer expires. The purpose of this second decision loop is to determine the falling edge of the first tone pair. Thus, the first decision loop insures that the tone pair is present for at least 130 milliseconds, while the second control loop determines that the tone pair is not longer than 170 milliseconds. Thus, the control loop between decision box 1022 and box 1040 detects whether the first tone pair is within a time window of 130 to 170 milliseconds.

Once the first tone pair has been detected and found valid, a timer is started again with a duration of 40 milliseconds at box 1040. At this stage in the software, the RTS signal must have a quiet period between tone pairs of approximately 50 milliseconds. Thus, when control is passed to decision box 1042, the microprocessor monitors the telephone line for any DTMF tones at all. If any tones are detected during the 40 millisecond quiet time window, control is passed to return box 1044 which returns a no valid RTS signal to the calling decision routine in FIG. 14. If no tone pair is detected in decision box 1042, control is passed to box 1046 which monitors the timer for the expiration of the 40 millisecond window. Thus, the timer loop between decision boxes 1042 and 1046 tests for a minimum quiet interval of 40 milliseconds. Once the timer expires, control is passed to decision box 1048 which detects once again whether any DTMF tones are present. If any DTMF tones are detected, control is once again passed to return box 1044 where the calling decision routine is returned with no valid RTS flag. If, however, the line is still quiet after 40 milliseconds, control is passed from decision box 1048 to box 1050 where a timer duration of 20 milliseconds is programmed to start. Control is then passed to box 1052 where the microprocessor monitors the telephone line to detect any additional DTMF tones during this interval. If no DTMF tones are detected, control is passed to decision box 1054 where the 20 millisecond timer is tested for expiration. If the timer expires during the quiet interval, control is returned once again to return box 1044 where control is passed back to the main calling decision routine in FIG. 14 with a no valid RTS flag. A loop is created between decision boxes 1052 and 1054 in which the quiet interval is tested for a second tone pair before expiration of a 60 millisecond time window. If a second tone is detected during this time loop, control is passed to box 1056, exiting the loop. Thus, between boxes 1040 and 1056, the subroutine of FIG. 18 is testing for a minimum quiet interval of 40 milliseconds with a maximum quiet interval of 60 milliseconds. Thus, the quiet interval must last between 40 and 60 milliseconds for the signature to be valid up to this point.

Entering box 1056, the microprocessor starts a 40 millisecond duration timer. Control is then passed to decision box 1060 where the microprocessor tests for the proper second DTMF tone pair. If an improper DTMF tone pair is detected at this point in the signature, control is once again passed to the return box 1044 which returns a no valid RTS flag to the main calling decision routine in FIG. 14. If the appropriate dual tone DTMF pair number two is detected at decision box 1060, control is passed to decision box 1068 which tests for the expiration of the 40 millisecond timer. Thus, a control loop is established between decision boxes 1060 and 1068 which tests for a minimum duration of the appropriate dual tone pair lasting a minimum of 40 milliseconds. If the test timer expires at decision box 1068 before the second tone pair disappears, control is passed to box 1058 where a 20 millisecond timer is programmed to start. Control is then passed to decision box 1062 which tests for the second DTMF tone pair once again. This time, however, if the second tone pair is not detected, control is returned to the main decision calling routine of FIG. 14 at box 1064. This is the only valid exit point from the wait routine of FIG. 18, indicating that a valid RTS signature was received by the line card. If the valid DTMF tone is still received at decision box 1062, control is passed to decision box 1066 which tests for the expiration of the 20 millisecond timer. Thus, a control loop is established between decision boxes 1062 and 1066 which tests for the termination of the second tone pair within the second 20 millisecond time interval. If the timer expires with the second tone pair still active, control is passed to return box 1070 which returns to the main calling decision routine of FIG. 14 with a no valid RTS flag. Thus, between boxes 1056 and 1070, a 40 to 60 millisecond time interval is established in which the second tone pair must fit. If the second tone pair is shorter or longer than the time window, a no valid RTS flag is returned. Thus, the weight routine of FIG. 18 carefully calculates the exact appropriate RTSS signature which will invoke the transmission of the local customer's telephone number by the line card.

Figures 15, 16:
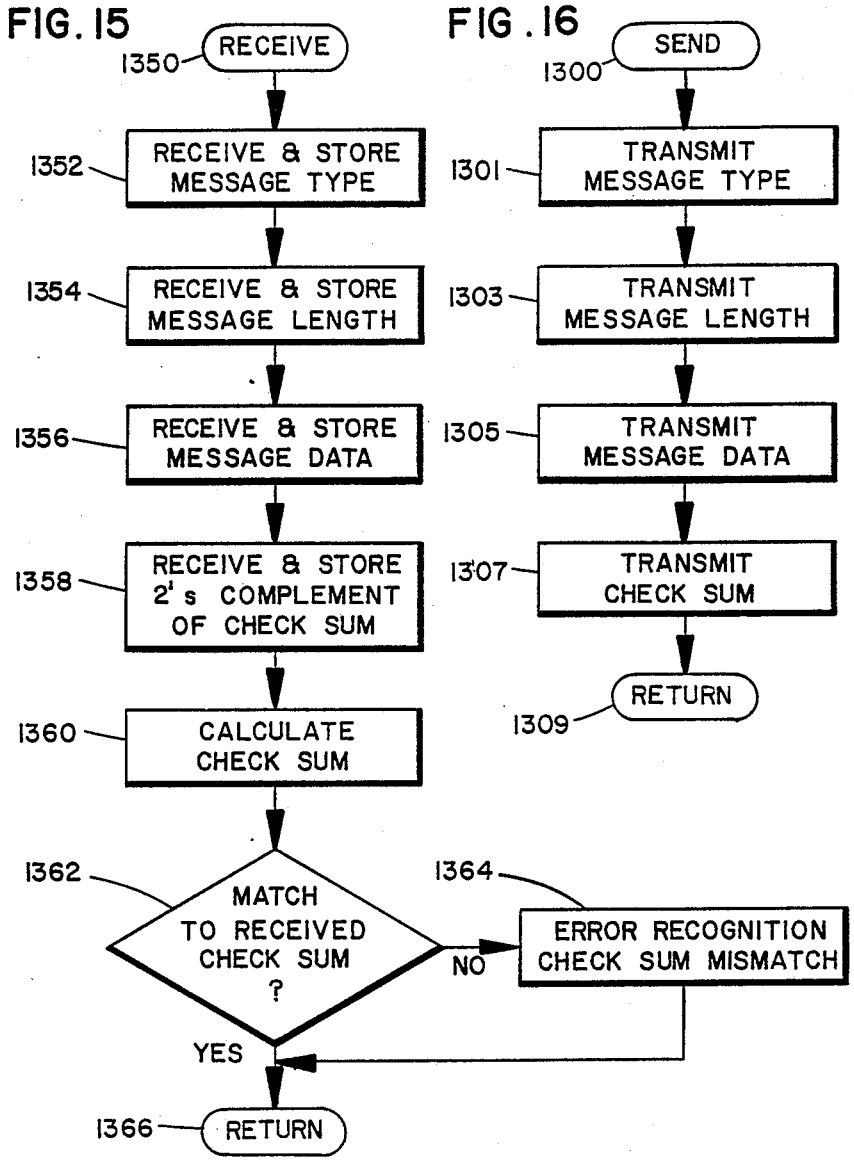

Returning once again to FIG. 14, control is returned from decision routine 1017 to subroutine 1019 if a valid RTS signal was received from the remote called party's central office. At this point in the main routine, subroutine send of FIG. 16 is invoked to transmit the appropriate RANI data. Control of the simple routine of FIG. 16 is entered at location 1300. Control is immediately passed to box 1301 where the line card transmits the message type to the remote receiving CPE. The message type in this case could be whether the calling party is a business, residential, pay phone, etc. After the message type is transmitted control i passed immediately to box 1303 which transmits the message length. This information is highly dependent upon the type of transmission techniques used and whether fixed format or free format data transmission techniques are used. Control is then passed to box 1305 which transmits the actual calling party's telephone number in a coded form. A check sum digit is also transmitted at the end of the message at box 1307 to allow the receiving central office to check the data beam forwarded to the CPE for data errors. Return box 1309 returns control to the calling routine 1019 in FIG. 14. Control is then passed back to decision box routine 1017 where the local line card continues to wait for a second RTS or for an on-hook condition. If no valid RTS signature was received by the local line card, no RANI data will be transmitted. Control is then passed from the wait routine 1017 to decision box 1021 which tests for an on-hook condition indicating the termination of the telephone call. If no on-hook condition is detected, the wait for RTS routine 1017 is continually called to test for a late coming RTS signature. When the local customer's equipment goes on-hook, control is returned from decision box 1021 to main idle loop of decision box 1003.

Referring once again to decision box 1005, if the local customer is a subscriber to the RANI service, control will be passed to subroutine box 1007 to transmit the RTS signal immediately upon an off-hook condition of a local subscriber's telephone equipment. Referring briefly to FIG. 3, since the local subscriber's line card cannot immediately determine whether the telephone subscriber is originating or receiving a telephone call, the local line card will always transmit a request to send signal 307 immediately after the subscriber's local telephone equipment goes off-hook at 306. If data is not received within 100 milliseconds of the transmission of the RTS signal, the local COELC assumes that the local subscriber is originating a call. However, if within 100 milliseconds of transmitting the RTS signal 309 data is received 308, it must be assumed that the local COELC is receiving or terminating the call.

Figure 17:
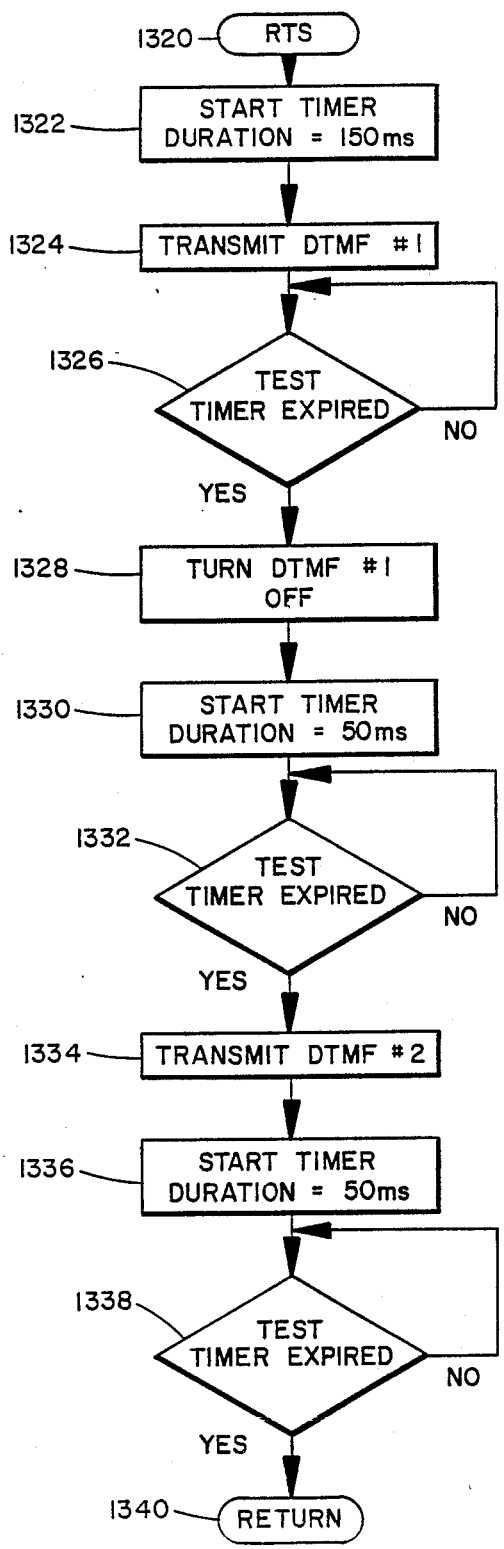

Referring once again to FIG. 14, transmission of the RTS signature at subroutine 1007 is performed immediately upon the off-hook condition if the local customer is a subscriber to the RANI service. The transmit RTS subroutine is shown in FIG. 17. Subroutine is entered at entrance point 1320 and goes immediately past to box 1322 where a timer is programmed to count for 150 milliseconds. Control is passed to box 1324 where the DTMF transceiver is set to transmit the tone pair number one. Control passing to decision box 1326 performs a tight loop to test when the timer has expired or counted out 150 milliseconds. When the timer has expired, control has passed to box 1328 where the DTMF transceiver is halted from outputting the first tone pair. Control passing to box 1330 programs the timer to count for 50 milliseconds. Control then passing to decision box 1332 accomplishes a tight loop in which the timer is monitored for timing out the 50 milliseconds. When the timer has expired, control passing box 1334 enables the DTMF transceiver to being transmitting the second tone pair of the signature. At box 1336 the programmable timer is set for 50 milliseconds and another tight loop is performed at decision box 1338 to count until the 50 milliseconds timer has expired. When the timer has expired at decision box 1338, control is returned through return path 1340 to the calling routine 1007 of FIG. 14. Thus the transmit RTS subroutine of FIG. 17 transmits the dual tone pair signature to request transmission of the calling party's telephone number from the remote central office.

Control is passed then from subroutine 1007 to decision box 1009 in FIG. 14. After the transmission of the RTS signature, the microprocessor of the line card monitors the telephone line for the receipt of incoming data and response to the RTS signal. If no RTS signal is received within 100 milliseconds, control is passed to box 1013 which assumes that the subscriber is originating the phone call and hence should be receiving an RTS signal rather than transmitting one. Control from box 1013 has been discussed in detail above. If however, data is received within the 100 millisecond time window of decision box 1009, control is passed to received message subroutine at location 1011 of the main control program in FIG. 14. The received message subroutine 1001 is described in FIG. 15 in detail.

The received message subroutine of FIG. 15 is a routine to merely monitor the incoming message since as was previously discussed above, it is the CPE portion of the RANI system in the preferred embodiment of the present invention that receives calling party's telephone number in encoded message form and displays it for the user. The line card does not normally process or record any information about the calling party. The received message subroutine however monitors the message as it is being passed to the CPE to check for errors and optionally could be used to record all received calls in a tabular form. The subroutine of FIG. 15 is primarily used to detect for errors, however, and to request retransmission when the message is garbled. Entry of the subroutine at location 1350 causes control to immediately be passed to box 1352 where the message type is received and stored. Next at box 1354, the message length of the header of the message is received and stored. At box 1356, the actual message containing the calling party's directory number is received and stored. Finally, at box 1358 a twos compliment version of the check sum digit of the message data is received and stored. The check sum is calculated at box 1360 and compared in decision box 1362 to the received check sum digit. If an error is detected, control is passed to 1364 which recognizes the error an records it. Optionally, box 1364 could invoke a subroutine to transmit by the FSK modem a request for retransmission to correct the problem. Regardless of the outcome of the check sum comparison, control is returned from the subroutine at box 1366 to the calling routine at location 1011 of FIG. 14. After the message has been received, control is passed to decision box 1015 which performs a tight loop to determine when the telephone equipment of the local subscriber goes on-hook indicating a termination of the call. When the local subscriber's telephone equipment does go on-hook, control is passed to box 1003 which is the main idle loop of the primary control program of the line card.

Those skilled in the art will readily recognize that a wide variety of control programs could be used to accomplish the functions performed in the preferred embodiment of the present invention by both the line card, the interface card and the CPE. Thus, it will be readily apparent to those skilled in the art that many modifications to the preferred embodiment of the present invention are possible without deviating from the scope and spirit of the present invention. Special conditions employed for the implementation of the preferred embodiment are not intended to be limiting and are easily adaptable to alternate implementations. For example, the control structure of the present invention is generally implemented using microcontrollers or microprocessors. However, it will be readily recognized and understood by those skilled in the art upon reading and understanding the specification and drawings that the control structure of the present invention may be implemented in a variety of different ways including the use of SSI logic functions, ROM microcode control, PLA or PAL logic structures and other types of hard wired or software controlled state machines.

Although specific logic configurations and electrical configurations have been illustrated and described for the preferred embodiment of the present invention set forth herein, it will be appreciated by those of ordinary skill in the art that any conventional logical or electrical arrangements which are calculated to achieve the same purpose may be substituted for the specific configurations shown. Thus, although conventionally available off the shelf discreet components of MSI and SSI logic is generally preferred due to its availability, electrical configurations and the logic described herein may be implemented through the use of conventional components and may be combined to a greater or lesser degree in a fewer number of LSI or VLSI components. Also, although specific components and their vendor sources are identified in the specification, it will be readily appreciated by those skilled in the art that alternate components and vendors may be substituted therefor.

While the present invention has been described in connection with a preferred embodiment thereof, it will be understood that many modifications will be readily apparent to those of ordinary skill in the art and this application is intended to cover any adaptations or variations thereof. Therefore, it is manifestly intended that this invention be limited only by the claims and the equivalents thereof.

What is claimed is:

1. A method of identifying the calling party to the called party in a telephone system comprising the steps of:
   originating a telephone call by dialing the called party's directory number;
   detecting, at a first premise remote from the called party's premises, an off-hook condition of the called party's telephone line;
   automatically sending from said first premise a request-to-send signal in response to detecting the called party's off-hook condition; transmitting the calling party's identifying information from a second premise remote from the premises of the calling party to the called party's telephone line in response to said request-to-send signal; and
   receiving said identifying information on said called party's telephone line.

2. The method according to claim 1 wherein the step of receiving includes:
   displaying the identifying information to the called party.

3. Method according to claim 1 further including, simultaneously with said step of transmitting, the step of opening said calling party telephone line to prevent interference with said step of transmitting.

4. Telecommunications system for identifying a calling party to a called party comprising:
   means, remote from the premises of said called party and operatively associated with a telephone line of said called party, for sending a signal to a telephone line of said calling party in response to an off-hook condition on said called party telephone line;
   means, remote from the premises of said calling party and operatively associated with said calling party telephone line, for transmitting identifying information of said calling party to said called party telephone line in response to said signal; and
   means, operatively associated with said called party telephone line, for receiving said identifying information.

5. System according to claim 4 wherein said receiving means includes means, connected to said called party telephone line, for displaying said identifying information.

6. System according to claim 4 further including means, cooperative with said transmitting means, for opening said calling party telephone line to prevent interference with said transmitting means.

7. System according to claim 4 wherein said receiving means includes:
   means, operatively associated with said called party telephone line, for decoding said identifying information; and
   means, operatively associated with said decoding means, for displaying said identifying information to said called party.

8. The component according to claim 7 wherein said receiving means further includes a modem for receiving said identification data in a digital form.

9. A central office equipment component, for use in a telecommunications system to identify a calling party to a called party comprising: at least one central office equipment line cards connected to telephone lines of said called and calling parties, said line cards including:
   means, remote from and operatively associated with said called party's telephone line, for detecting an off-hook condition on said called party's telephone line;
   means, operatively associated with said detecting means, for
   generating a single request-to-send signal in response to said detecting means detecting an off-hook condition;
   means, operatively associated with a telephone line of said calling party and remote from the premises of said calling party, for conveying said calling party's identifying information in response to receiving said request-to-send signal;
   means operatively associated with said called party telephone line for accepting said identifying information; and
   at least one interface card in said central office operatively associated with said line cards and connectable to a database.

* * * * *